United States Patent [19]
Buxton et al.

[11] Patent Number: 5,978,579
[45] Date of Patent: Nov. 2, 1999

[54] ARCHITECTURE FOR CUSTOMIZABLE COMPONENT SYSTEM

[75] Inventors: Jeffrey J. Buxton, North Andover; Eric S. Portner, Northborough; David N. Dupre, Brookline, all of Mass.

[73] Assignee: International Business Machines Corporation, Armonk, N.Y.

[21] Appl. No.: 08/909,995

[22] Filed: Aug. 12, 1997

[51] Int. Cl.⁶ .............................. G06F 9/45; G06F 9/44
[52] U.S. Cl. ...................... 395/701; 395/703; 395/712
[58] Field of Search .................................. 395/701, 702, 395/703, 712

[56] References Cited

U.S. PATENT DOCUMENTS

| | | | |
|---|---|---|---|
| 4,935,888 | 6/1990 | Heston | 361/680 |
| 5,189,608 | 2/1993 | Lyons | 705/30 |
| 5,367,573 | 11/1994 | Quimby | 380/25 |
| 5,500,802 | 3/1996 | Morris et al. | 364/474.24 |
| 5,517,645 | 5/1996 | Stutz et al. | 395/680 |
| 5,560,014 | 9/1996 | Imamura | 395/701 |
| 5,603,021 | 2/1997 | Spencer et al. | 707/4 |
| 5,692,047 | 11/1997 | McManis | 380/4 |
| 5,710,920 | 1/1998 | Maruyama et al. | 707/103 |
| 5,710,926 | 1/1998 | Maurer | 395/701 |
| 5,715,441 | 2/1998 | Atkinson et al. | 707/1 |
| 5,724,589 | 3/1998 | Wold | 395/701 |
| 5,729,748 | 3/1998 | Robbins et al. | 395/705 |
| 5,754,858 | 5/1998 | Broman et al. | 395/701 |
| 5,754,864 | 5/1998 | Hill | 395/712 |
| 5,761,499 | 6/1998 | Sonderegger | 707/10 |
| 5,771,347 | 6/1998 | Grantz et al. | 380/25 |
| 5,790,796 | 8/1998 | Sadowsky | 395/200.51 |
| 5,819,283 | 10/1998 | Turkowski | 707/103 |
| 5,845,128 | 12/1998 | Noble et al. | 395/712 |
| 5,860,004 | 1/1999 | Fowlow et al. | 395/701 |
| 5,867,709 | 2/1999 | Klencke | 395/702 |

OTHER PUBLICATIONS

Cowart, Robert, "Mastering Windows 3.1", Sybex Inc., pp. 489–499, 767–769, 894–896, 1993.

Sneed, H. Wills, L.; Baxter, I.; Chikofsky, E.; "Encapsulating Legacy Software for Use in Client/Server Systems", Proceedings of the Third Working Conference on Reverse Engineering, pp. 104–119, 1996.

Orfali, R.; Harkey, D.; Edward, J.; "The Essential Distributed Objects Survival Guide"; John Wiley & Sons, Inc., pp. 283–295 and 429–452, 1996.

Newell, D.; Jones, O.; Machura, M.; "Interoperable Object Models for Large Scale Distributed Systems"; International Seminar on Client/Server Computing (IEE Digest No. 1995/184); vol. 1, pp. 14/1–14/6, 1995.

"Self–Contained Reusable Programmed Components"; IBM Technical Disclosure Bulletin; vol. 38, No. 7, pp. 283–285, 1995.

(List continued on next page.)

*Primary Examiner*—Tariq R. Hafiz
*Assistant Examiner*—Brian Sattizahn
*Attorney, Agent, or Firm*—Kudirka & Jobse, LLP

[57] ABSTRACT

A component customization and distribution system in an object-oriented environment provides a template builder utility which enables a base component to be selectively modified and the modifications to the base component stored as a template. The template is formatted into a distribution pack which may be then distributed to a recipient computer system having a similar base component loaded thereon. A loader utility utilizes the information contained within the template inconjunction with the functionality of the base component to modify the behavior of the base component to conform to the customizations or modifications created with the template builder utility. The component loader utility spoofs the base component by selectively forwarding method calls to/from the base component and selectively modifying the results of method calls in response to information contained in the template.

22 Claims, 11 Drawing Sheets

OTHER PUBLICATIONS

Brpwm et al., Footstore searcher tours ONLINE/CD–ROM'92 exhibits. "Dayone/Daytwo" in DIALOG(R) File 148 Jan. 1993.

In M2 Presswire the article "Topseed's clarion for windows adds 32–bit development option" in Dialog file(R) Apr. 1995

Kythe, Dave, "The Promise of Distributed Business Components", AT&T Technical Journal, vol. 75 pp. 20–29, Apr. 1996.

"Lotus Components—Developing Notes Applications with Lotus Componets", Lotus Development Corporationn, Ch. 7, pp. 130–147, Nov. 1996.

ARCHITECTURE FOR CUSTOMIZABLE COMPONENT SYSTEM

COPENDING APPLICATIONS

This application is the one of five U.S. patent applications filed on an even date herewith and commonly assigned, including:

Ser. No. 08/910,366, Attorney Docket No. L09-97-015, by Jeffrey J. Buxton, et. al. entitled "Method and Apparatus for Building Templates in a Component System";

Ser. No. 08/910,144, Attorney Docket No. L09-97-039, by Jeffrey J. Buxton, entitled "Method and Apparatus for Storing Templates in a Component System";

Ser. No. 08/909,753, Attorney Docket No. L09-97-006, by Jeffrey J. Buxton, et. al. entitled "Method and Apparatus for Loading Components in a Component System"; and Ser. No. 08/910,140, Attorney Docket No. L09-97-038, by Jeffrey J. Buxton entitled "Method and Apparatus for Distributing Templates in a Component System.

The subject matters of the above-identified copending patent applications are hereby incorporated herein by reference.

FIELD OF THE INVENTION

This invention relates generally to improvements in computer systems, and, more particularly, to a system for creating and distributing customized applications.

BACKGROUND OF THE INVENTION

In the evolution of data processing systems, much of the functionality which previously had been performed by hardware system components is now being constructed utilizing software programming instead. Such an approach disfavors proprietary hardware architectures and encourages open system architectures on which a multitude of software algorithms can be executed on a common hardware architecture. As a result, software programs or applications have become more powerful and increasingly complex. Unfortunately, numerous difficulties arise in the development and maintenance of such software applications. Traditional applications have become so large and complex that even minor changes may take several weeks or months to implement. Accordingly, the trend in both software development and program language development is towards more modular, self-contained software designs.

One of the major developments in the field of software design has been the emergence of object-oriented technology. As explained in greater detail hereinafter, object-oriented technology enables the analysis, design and implementation of software systems with intelligent, autonomous agents called objects. Such objects facilitate the design of modular software which more closely mimics the physical or logical entities within the real world.

Despite the emergence of object-oriented technology most end-users have been typically unable to directly utilize the efficient, more modular design of an application, even if the application has been designed using object-oriented technology. For example, users of applets, i.e., small applications such as spreadsheets and file viewers, typically wish to customize such applications for their own preferred tasks and to allow such applications to interact with one another to form larger customized applications without having to redesign or make extensive modifications to such applications. Further, even if such applications were modifiable, their inherent value is often directly related to the ability to distribute such customized applications with accompanying data in a manner which is both efficient and respects the intellectual property rights of the authors. Accordingly, a need exists for a system of intelligent, self-contained software modules which may be used to construct larger applications in a modular fashion. Further, a need exists for a technique in which software applications may be modified as desired by an end-user in the manner which is both simplified and efficient.

A further need exists for a technique in which such modifications to standard applications may be distributed and used in an efficient manner. In addition, a need exists for a technique in which use and distribution of such customized application may be performed only by those who are properly authorized by the software licensor.

SUMMARY OF THE INVENTION

The present invention provides a component system in which a number of base applications, i.e. components, such as file viewers, spreadsheets, draw/diagram utilities, etc. may be customized by a user and the customizations, i.e., the differences from the base applications, distributed in the form of a template to another user having the same base applications on his/her system. A special loader utility, when used in conjunction with the template and the base application from which the template was derived, enables the recipient system to recreate the behavior of the customized application.

The invention is contemplated for use in object-oriented system in which components are implemented as objects. A template builder utility allows a user to select a base component, modify the persistent data of the component, and store the modifications as a template in a predetermined format. The template builder utility further enables the user to package templates in a template distribution package format which enables the templates to be distributed to other users having the same base components installed on their systems. A component loader utility loads the template onto a recipient user system and utilizes the information contained within the template distribution pack to spoof the already installed base component. The method of spoofing is achieved using aggregation of object properties so that method calls to the template component are selectively directed to the base component by the component loader utility. The component loader utility, however, reserves the right of changing, enhancing or disabling the results of the method call to recreate the behavior of the customized or template component.

According to one aspect of the present invention, an apparatus for creating templates of customizations to a base component comprises component loader logic configured to load a base component on to the computer system, template builder logic configured to enable selection of a base component and modification of persistent data of the base component, template stored logic configured to format the modifications to the base component into a template format suitable for storage, and a template storage file for storing one or more templates therein. In one embodiment, a distribution pack generator responsive to the template builder logic and the template storage file generates a template distribution pack containing at least one template and a template installer program. In another embodiment, the template contains not only modifications to the persistent data of the base component but also user-defined instructions relating to such modifications as well as one or more keys into the operating system file registry where information about the base component resides.

In accordance with a second aspect of the present invention, a computer program product for used with an object-oriented computer system having an operating system capable of executing one or more base components comprises a computer usable medium having program code embodied on the medium. The program code comprises code responsive to a base component for loading of the base component on the computer system, and code defining at least one base component. In one embodiment, the medium further comprises program code defining a template storage file and program code for storing template data in the template storage file. In another embodiment, the medium contains additional program code responsive to the base component and the template data for selectively forwarding method calls to the base component and selectively modifying results of the method call to modify behavior of the base component as defined by template data.

In accordance with the third aspect of the present invention, a method of customizing components in an object-oriented computer system includes the steps of electing a base component, modifying the state of persistent data of the base component, saving the modifications to the base component, and formatting the modifications into a template suitable for utilization on another system having the same component.

BRIEF DESCRIPTION OF THE DRAWINGS

The above and other features, objects and advantages of the invention will be better understood by referring to the following detailed description in conjunction with the accompanying drawing in which.

DETAILED DESCRIPTION

Figure 1:
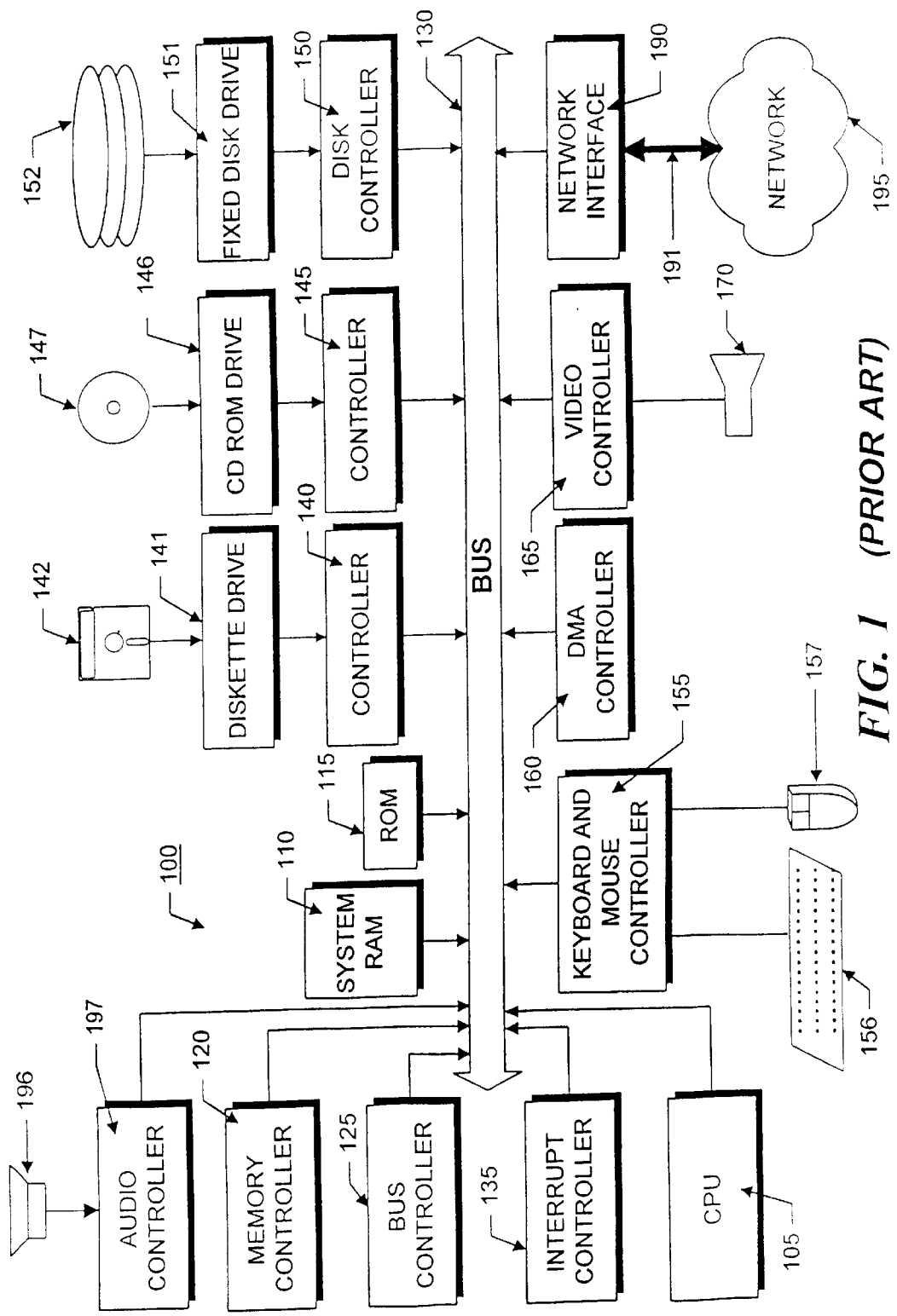
FIG. 1 is a block diagram of a computer system suitable for use with the present invention.

FIG. 1 illustrates the system architecture for a computer system 100 such as an IBM PS/2®, on which the invention may be implemented. The exemplary computer system of FIG. 1 is for descriptive purposes only. Although the description may refer to terms commonly used in describing particular computer systems, such as in IBM PS/2 computer, the description and concepts equally apply to other systems, including systems having architectures dissimilar to FIG. 1.

Computer system 100 includes a central processing unit (CPU) 105, which may be implemented with a conventional microprocessor, a random access memory (RAM) 110 for temporary storage of information, and a read only memory (ROM) 115 for permanent storage of information. A memory controller 120 is provided for controlling RAM 110.

A bus 130 interconnects the components of computer system 100. A bus controller 125 is provided for controlling bus 130. An interrupt controller 135 is used for receiving and processing various interrupt signals from the system components.

Mass storage may be provided by diskette 142, CD ROM 147, or hard drive 152. Data and software may be exchanged with computer system 100 via removable media such as diskette 142 and CD ROM 147. Diskette 142 is insertable into diskette drive 141 which is, in turn, connected to bus 130 by a controller 140. Similarly, CD ROM 147 is insertable into CD ROM drive 146 which is, in turn, connected to bus 130 by controller 145. Hard disk 152 is part of a fixed disk drive 151 which is connected to bus 130 by controller 150.

User input to computer system 100 may be provided by a number of devices. For example, a keyboard 156 and mouse 157 are connected to bus 130 by controller 155. An audio transducer 196, which may act as both a microphone and a speaker, is connected to bus 130 by audio controller 197, as illustrated. It will be obvious to those reasonably skilled in the art that other input devices, such as a pen and/or tabloid may be connected to bus 130 and an appropriate controller and software, as required. DMA controller 160 is provided for performing direct memory access to RAM 110. A visual display is generated by video controller 165 which controls video display 170. Computer system 100 also includes a communications adaptor 190 which allows the system to be interconnected to a local area network (LAN) or a wide area network (WAN), schematically illustrated by bus 191 and network 195.

Operation of computer system 100 is generally controlled and coordinated by operating system software, such as the OS/2® operating system, available from International Business Machines Corporation, Boca Raton, Fla. or Windows 95 from Microsoft Corp., Edmond, Wash. The operating system controls allocation of system resources and performs tasks such as processing scheduling, memory management, networking, and I/O services, among things. In particular, an operating system 210 resident in system memory and running on CPU 105 coordinates the operation of the other elements of computer system 100. The present invention may be implemented with any number of commercially available operating systems including OS2, UNIX Windows NT and DOS, etc. One or more applications 202 such as Lotus Notes, commercially available from Lotus Development Corp., Cambridge, Mass., may be executable under the direction of operating system 215. If operating system 215 is a true multitasking operating system, such as OS2, multiple applications may execute simultaneously.

Figure 2:
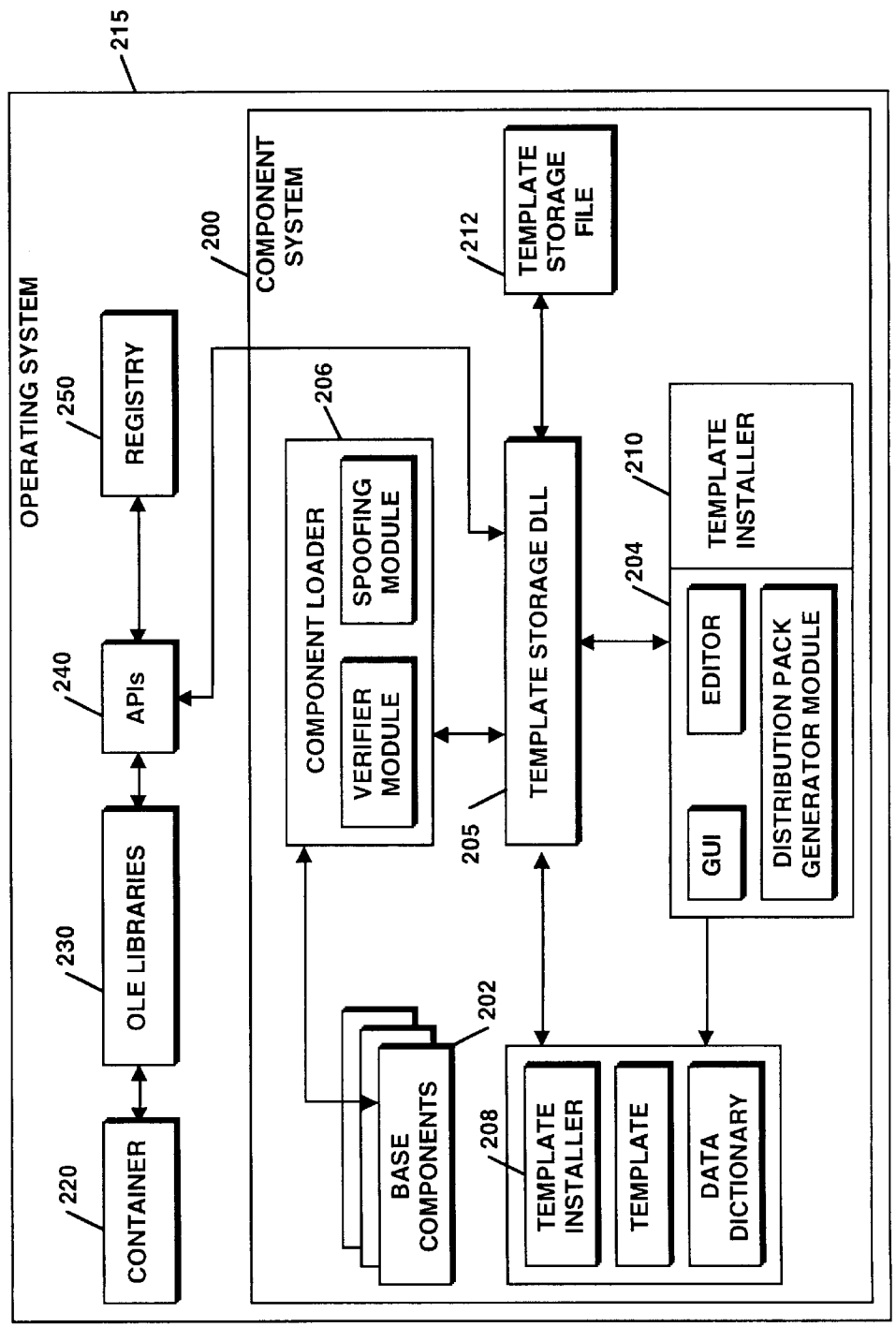
FIG. 2 is a conceptual diagram of the elements comprising the component system in accordance with the present invention.

FIG. 2 illustrates conceptually the component system 200 in accordance with the present invention. In a preferred embodiment, the elements of component system 200 are implemented in the C++ programming language using object-oriented programming techniques. C++ is a compiled language, that is, programs are written in a human-readable script and this script is then provided to another program called a compiler which generates a machine-readable numeric code that can be loaded into, and directly executed by, a computer. As described below, the C++ language has certain characteristics which allow a software developer to easily use programs written by others while still providing a great deal of control over the reuse of programs to prevent their destruction or improper use. The C++ language is well-known and many articles and texts are available which describe the language in detail. In addition, C++ compilers are commercially available from several vendors including Borland International, Inc. and Microsoft Corporation. Accordingly, for reasons of clarity, the details of the C++ language and the operation of the C++ compiler will not be discussed further in detail herein.

As will be understood by those skilled in the art, Object-Oriented Programming (OOP) techniques involve the definition, creation, use and destruction of "objects". These objects are software entities comprising data elements, or attributes, and methods, or functions, which manipulate the data elements. The attributes and related methods are treated by the software as an entity and can be created, used and deleted as if they were a single item. Together, the attributes and methods enable objects to model virtually any real-world entity in terms of its characteristics, which can be represented by the data elements, and its behavior, which can be represented by its data manipulation functions. In this way, objects can model concrete things like people and computers, and they can also model abstract concepts like numbers or geometrical designs.

Objects are defined by creating "classes" which are not objects themselves, but which act as templates that instruct the compiler how to construct the actual object. A class may, for example, specify the number and type of data variables and the steps involved in the methods which manipulate the data. When an object-oriented program is compiled, the class code is compiled into the program, but no objects exist. Therefore, none of the variables or data structures in the compiled program exist or have any memory allotted to them. An object is actually created by the program at runtime by means of a special function called a constructor which uses the corresponding class definition and additional information, such as arguments provided during object creation, to construct the object. Likewise objects are destroyed by a special function called a destructor. Objects may be used by using their data and invoking their functions. When an object is created at runtime memory is allotted and data structures are created.

The principle benefits of object-oriented programming techniques arise out of three basic principles; encapsulation, polymorphism and inheritance. More specifically, objects can be designed to hide, or encapsulate, all, or a portion of, the internal data structure and the internal functions. More particularly, during program design, a program developer can define objects in which all or some of the attributes and all or some of the related functions are considered "private" or for use only by the object itself. Other data or functions can be declared "public" or available for use by other programs. Access to the private variables by other programs can be controlled by defining public functions for an object which access the object's private data. The public functions form a controlled and consistent interface between the private data and the "outside" world. Any attempt to write program code which directly accesses the private variables causes the compiler to generate an error during program compilation which error stops the compilation process and prevents the program from being run.

Polymorphism is a concept which allows objects and functions which have the same overall format, but which work with different data, to function differently in order to produce consistent results. For example, an addition function may be defined as variable A plus variable B (A+B) and this same format can be used whether the A and B are numbers, characters or dollars and cents. However, the actual program code which performs the addition may differ widely depending on the type of variables that comprise A and B. Polymorphism allows three separate function definitions to be written, one for each type of variable (numbers, characters and dollars). After the functions have been defined, a program can later refer to the addition function by its common format (A+B) and, at runtime, the program will determine which of the three functions is actually called by examining the variable types. Polymorphism allows similar functions which produce analogous results to be "grouped" in the program source code to produce a more logical and clear program flow.

The third principle which underlies object-oriented programming is inheritance, which allows program developers to easily reuse pre-existing programs and to avoid creating software from scratch. The principle of inheritance allows a software developer to declare classes (and the objects which are later created from them) as related. Specifically, classes may be designated as subclasses of other base classes. A subclass "inherits" and has access to all of the public functions of its base classes just as if these function appeared in the subclass. Alternatively, a subclass can override some or all of its inherited functions or may modify some or all of its inherited functions merely by defining a new function with the same form (overriding or modification does not alter the function in the base class, but merely modifies the use of the function in the subclass). The creation of a new subclass which has some of the functionality (with selective modification) of another class allows software developers to easily customize existing code to meet their particular needs.

Object-oriented technology forms the basis for component system 200 of the present invention. For the purpose of the illustrative embodiment, components are essentially C++ objects that conform to an object model, such as Microsoft's Component Object Model. An object module is a unifying set of rules that describe object structure, object life cycle, and inter-object communication. Object structure relates to the physical layout of objects in memory, while object life cycle refers to how applications create and destroy objects. Inter-object communication refers to protocols by which objects communicate with one another. Object modules are useful in contexts where all objects in a given system need to conform to a given protocol governing these parameters. Most object-oriented and object-based languages, including the C++ programming language, do not specify true object modules, but merely specify syntax and semantics of a basic object implementation without specifying the rules that unify object systems.

Component system 200 of the present invention will be described by way of example as being implemented using Microsoft's Component Object Model (COM) and Object Linking and Embedding (OLE) standards. Other object models, however, such as IBM Corporation's System Object Model (SOM) and Distributed System Object Model (DSOM), may be utilized for implementing the inventive component system described herein. MicroSoft has published a COM specification which defines a set of rules intended to unify all objects in a given software system and which further identifies and defines a number of standard interfaces, e.g. publicly available protocols, that have been found to be universally applicable to the development of object-oriented software. For example, COM specifies the interfaces for object creation, persistence, event notification, visual rendering, etc. The actual implementation of the interfaces as defined by the COM specification, is left to the software developer.

When an object conforms to the COM specification, the object behaves functionally as described by the COM interface. Generally, an object which implements the COM interface is referred to as a server, while applications and other objects that use these interfaces are referred to as clients. Accordingly, through interfaces, the COM specification defines a simple client/server module.

Microsoft Corporation has also published an Object Linking and Embedding (OLE) 2.0 specification which defines the rules regarding linking and embedding of object which conform to the COM specification. OLE is a set of system-level services which utilize the interfaces defined by the COM specification. These services are implemented as a series of OLE libraries in the form of Dynamic Link Libraries (DLLs) that come with the Microsoft's Windows operating system and supply built-in services that do generalized, low-level tasks. One of the mechanisms defined by OLE specification is referred to as an OLE control (OCX). Controls are autonomous software building blocks which embody all other OLE technologies. OLE controls are implemented as in-process servers, i.e. dynamic link libraries, which implement extra interfaces required to handle such functions as automation, inside/outside activation, events, properties and change notifications.

OLE controls operate within the context of applications referred to as containers. A container is a stand-alone application capable of embedding OLE controls. As a result, containers themselves implement a set of interfaces to deal with items such as a tool bar, menu and status bar negotiation, events, properties, control placement and sizing, etc.

Having defined the object-oriented technology and exemplary specifications, including the COM specification and the OLE specification, with which the inventive component system may be designed, the component system itself will be described with reference to component structure, and elements of the component system.

Component System

FIG. 2 illustrates conceptually the inventive component system 200 and various elements of operating system 215 which interact with the component system 200, but are not considered part of the component system 200. Specifically, component system 200 comprises one or more base OLE controls 230, referred to hereinafter as "components" or "base component", a template builder 204, a template installer executable 210, a component loader 206, a template storage DLL 205, a template storage 212, and, optionally, a distribution pack 208. The elements of the operating system which interact with component system 200 include an OLE container 220, OLE libraries 230, application program interfaces (APIs) 240 which may comprise WIN 32 API designed by Microsoft Corp., and the operating system registry 250.

In the illustrative embodiment, operating system 215 comprises the Windows 95 or Windows NT operating system, both available from MicroSoft Corporation, Redmond, Wash. Container 220 may comprise any stand alone application capable of embedding OLE controls. A container 220 interacts with the WIN32 APIs 240 through the OLE libraries 230 in order to insert OLE objects or controls into the operating system registry 250. Examples of OLE containers are Lotus Notes available from Lotus Development Corporation, Cambridge, Mass., and MicroSoft Word, available from MicroSoft Corporation, Redmond, Wash. OLE libraries 230 comprise the set of system-level services in accordance with the OLE specification 2.0. The OLE libraries function to call the WIN32 APIs 240 to locate registered objects in registry 250 and to insert and create object dialog and return results to callers. When creating an OLE object or an OLE control, OLE libraries 230 call the WIN32 APIs 240 to read the registry 250 and to find out the server for an object or a control. The OLE libraries 230 further cause the server to be loaded and to cause the ICLASSFACTORY interface to be called to create the instance of an OLE control.

Registry 250 comprises a file in memory, typically on disk, containing information registered about various programs and objects. The system registry 250 is organized into "hives" and structured hierarchically. A hive is a discrete body of root level keys, subkeys, and values that is rooted at the top of the registry hierarchy. A hive is backed by a single file and LOG file. In the illustrative embodiment, hives are portions of the Windows registry that contain a subtree of registry entries. There are five hives: HKEY_LOCAL_MACHINE, HKEY_CLASSES_ROOT, HKEY_USERS_, HKEY_CURRENT_CONGIF, and HKEY_CURRENT_USER. Data items within the registry 250 are retrievable via calls to the WIN32 APIs 240.

The elements of component system 200 are described hereinafter in greater detail. Headings have been inserted into the specification to assist the reader in locating those sections of interest.

Component system 200 may function as a standalone application or may be used with Lotus Notes or any software application which implements OLE controls. A component system 200 implemented in accordance with the present invention is commercially available from Lotus Development Corporation, Cambridge, Mass. as the Component Starter Pack 1.0. The standard components included with the Component Starter Pack 1.0 include applications such as Chart, Comment, Draw/Diagram, File Viewer, Project Scheduler, and Spreadsheet, in addition to a template builder utility and a component loader utility.

A user interface enables a user to interact with component system 200 and may be implemented with a simple command line interpreter or may have a more sophisticated graphic user interface with pull down menus to select various options available, such as selection of a specific component, the component loader 206, the template builder 204, etc. The design of such a user interface is within the scope of those reasonably skilled in the arts.

Component Structure

Figure 3A:
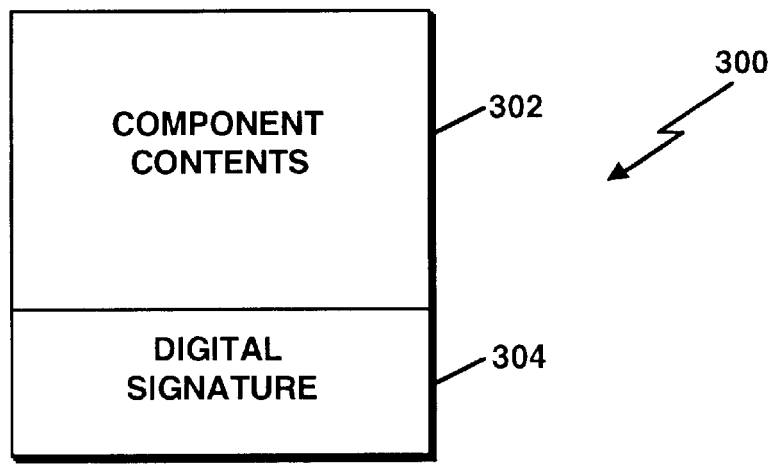
FIG. 3A is a conceptual diagram of the structure of a component in accordance with the present invention.

FIG. 3A illustrates conceptually the logical structure of a component 300 similar to components 202 of FIG. 2. In the illustrative embodiment, component 300 may be implemented as any OLE control having all or a portion of the functionality described in OLE specification. Such an implementation allows component 300 to function as an intelligent, self-contained software module that may be used to construct other software in a modular fashion and which allows components to communicate with one another and to be integrated smoothly with other applications. The methods of the object(s) within each component perform the functions which characterize the nature of the component content, e.g., a file viewer, a project scheduler, a spreadsheet, etc. Such objects typically include methods to present a standardized graphic user interface, negotiate menus and exchange data with other applications and databases. In addition, when placed in other containers, components 300 may act like a traditional OLE control, as defined in the OLE specification. Components 300 register themselves in registry 250 with WIN32 APIs 240 so that the OLE libraries 230 are aware of the component's existence.

Component 300 comprises component contents 302 and a digital signature 304. Component content 302 are defined by the software developer and comprise one or more objects or classes of objects whose respective methods define the specific functionality of the component, i.e., a spreadsheet, a file viewer, etc. Provided the appropriate interfaces which adhere to both the COM specification and the OLE specification are implemented within the component contents 302, the actual functions implemented by the component are left to the discretion of the software programmer.

In the illustrative embodiment, a digital signature 304, appended to component contents 302, uniquely identifies the component and the vendor or source of the component. Digital signature 304 may be implemented as a hash of the component contents and may be encrypted using any number of commercially available encryption algorithms, such as Message Digest, Version 5, commercially available from RSA Data Securities, Inc., Redwood, Calif. The content of the actual component itself does not have to be encrypted directly, although such may be an option of the system designer without affecting the functionality of the invention. In such an implementation, the component vendor encrypts digital signature 304 with the private key portion of a public/private key encryption combination using the above-described encryption technology. The vendor would then make publicly available the public key portion of the public/private key encryption combination to allow use of the component 300. The message digest algorithm used to generate the hash of the component contents may be created and encrypted at the vendor's site. In order for all users of component 300 to have the same public key for each component, a message digest algorithm is typically created at the time of code build of the component. Alternatively, if each customer is to have a different public key, the message digest may be created once a user orders the component or component system. In the latter scenario, the digital signature is added following code build of the component.

In the illustrative embodiment, component 300 supports OLE aggregation. Aggregation refers to the technique of forming an aggregate or composite object from two or more objects, typically a control object and a noncontrol object, each of which have their own interfaces. Typically, the control object forms the aggregate object's personality and determines how the aggregate object operates, making decisions about which of the interfaces are exposed publicly, outside of the object, and which interfaces remain private. The control object typically has a special instance of the IUNKNOWN interface referred to as the controlling unknown which is implemented as part of the new code written when the aggregate object is formed. The IUNKNOWN interface is defined in the OLE specification. The control object holds a pointer to the noncontrol objects IUNKNOWN interface implementation so that the control object can call the noncontrol methods when appropriate. The noncontrol object holds a pointer to the controlling objects IUNKNOWN implementation for the same reason. The net result of aggregation is the ability to reuse interface implementations, allowing multiple objects having different interfaces to be combined into composite object having interfaces which are combinations of its constituent objects.

Figure 3B:
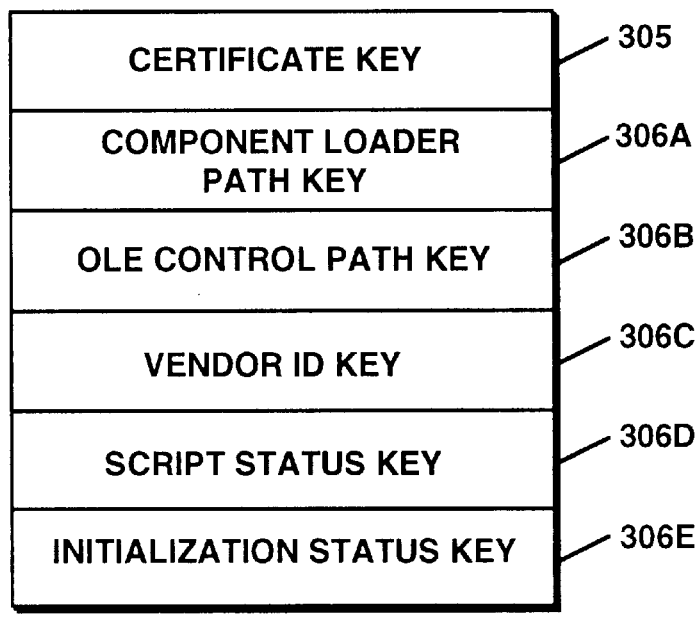
FIG. 3B is a conceptual diagram of the structure of the registry entries associated with the component of FIG. 3A.

In addition to component contents 302 and digital signature 304, a number of entries in the system registry 250, in the form of registry keys or subkeys, are associated with each component, as illustrated in FIG. 3B. Under the CLSID root for the global unique ID (GUID) for each object loaded or spoofed by the loader, as explained hereinafter, a number of keys reside within registry 250. Generally, each OLE control has a subkey under the CLSID interface that OLE libraries 230 use to find out information about the OLE control. Most OLE object application information is stored in subkeys under the CLSID root key. As a result, only classes explicitly intended to be user-visible appear when the registration database viewer is executed. The immediate subkey of the CLSID root key is a string version of the CLSID. The subkey indicates where the code that services an object class can be find. Most of the information found under the CLSID root key is used by the OLE default object handler to return various information about an object's class when the object is in the loaded state.

FIG. 3B shows conceptually a number of keys and subkeys associated with a component 300 but maintained within registry 250. A certificate key 305, as illustrated in FIG. 3B, contains all the registered certificates of a component. Each certificate may be implemented as a subtree under a terms tree and may be an encrypted binary file containing the vendor's name, the component's public key, and an optional time-trial value.

In addition, each component 300 has subkeys 306 as illustrated in FIG. 3B and described in Table 1 herein. For example, key 306A contains information defining the full path name to component loader 206. Key 306B contains information identifying the original value of the component loader and refers to the original OLE control or object being spoofed, also known as the base control. Key 306C may comprise a binary signature indicating the specific vendor or source of the component. Key 306D contains information indicating that the subject component is an OLE control which may be safely scripted. Key 306E contains information indicating that the subject component is an OLE control that is safely initializable for persistent data in an object-oriented environment.

To assist the reader in understanding the structure and function of the component system set forth herein, several key OLE interfaces are described below.

An ISTREAM is an OLE interface which supports reading and writing of data to stream objects. Stream objects are elements nested within a storage object and are similar to standard files. Stream objects are typically used to store data for an application.

An ISTORAGE is an OLE interface which supports the creation and management of structure storage objects. Such structured storage objects provide hierarchical storage of information within a single file similar to a file system within a file. Storage objects act like directories within a file system and provide the structure within a structure storage object. Structured storage objects can contain other storage objects or stream objects. Stream objects act like files within a traditional file system and contain the actual data content in a storage object. The OLE specification provides an implementation of the ISTORAGE interface in compound files and provides a set of functions for using the compound file implementation of storage objects. OLE structured storage files are also known as compound document files and function as a root ISTORAGE interface. Such ISTORAGE interfaces may contain other ISTORAGE interfaces or ISTREAM interfaces nested to an arbitrary depth.

A CLSID identifies the functionality of an object class that can display and/or provide programmatic access to property values. Most OLE object application information is stored in subkeys under the CLSID root key of the file system registry. A subkey is used by an OLE control under the CLSID to find out information about the control.

An FORMATETC (abbreviated FMTETC) is an OLE data structure which acts in a generalized clipboard format. The FORMATETC structure encompasses a target device the aspect or view of the data and a storage medium indicator. The FORMATETC data structure is used as a parameter in OLE functions and methods that require data format information.

Template Builder

Figure 4A:
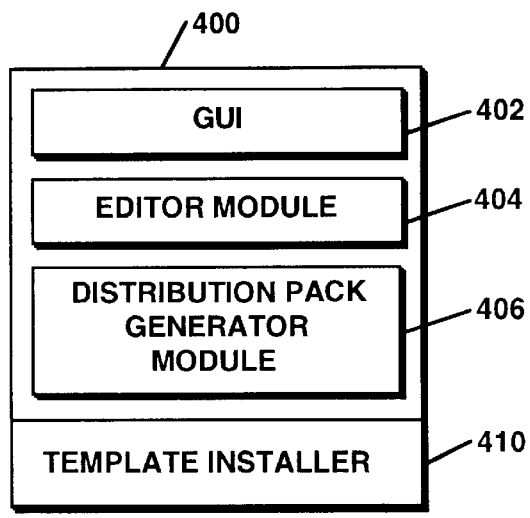
FIG. 4A is a conceptual block diagram of a template builder in accordance with the present invention.
Figure 4C:
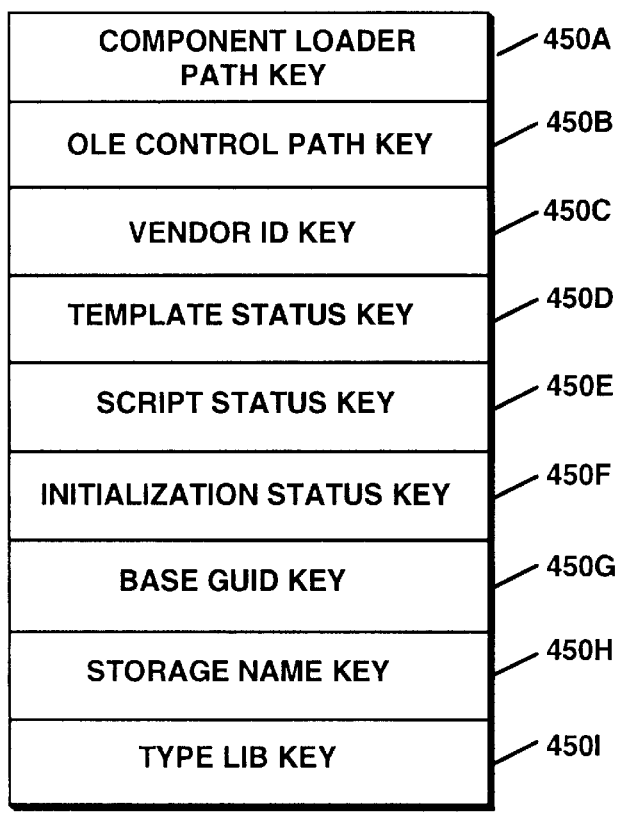
FIG. 4C is a conceptual block diagram of the registry entries associated with the template of FIG. 4B.
Figure 4B:
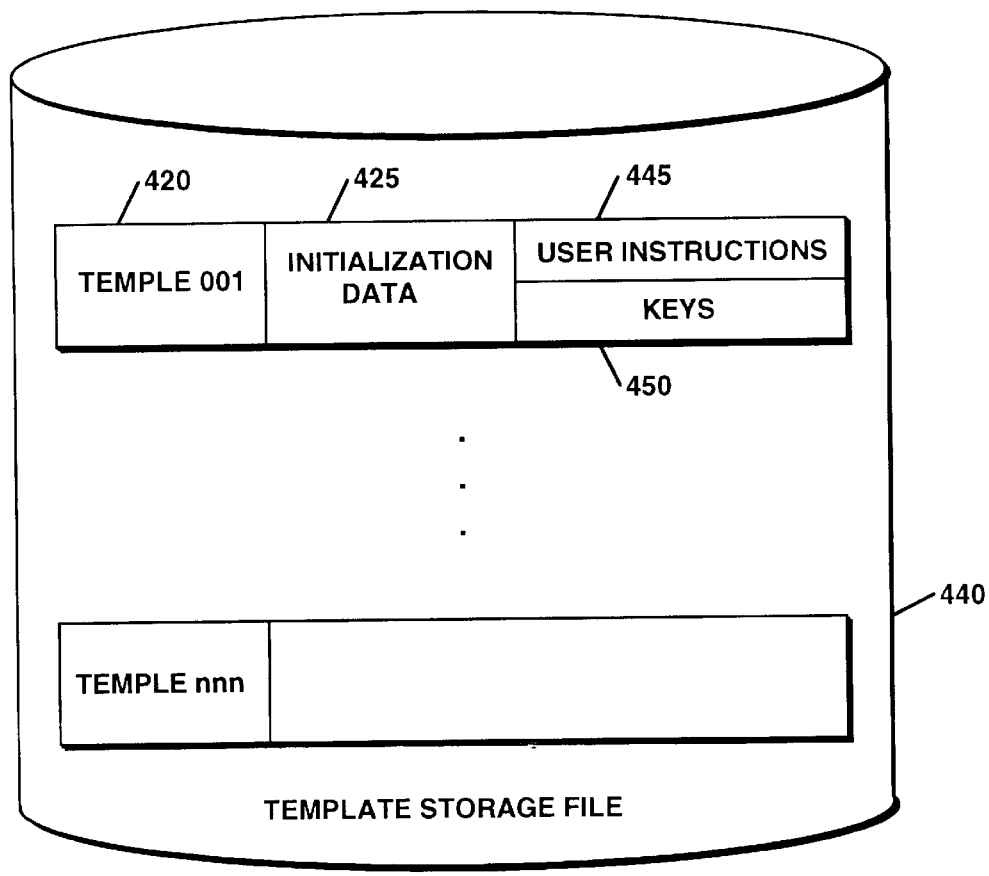
FIG. 4B is a conceptual block diagram of the structure of a template and a template storage file in accordance with the present invention.

Template builder 204, indicated in FIG. 4A as template builder 400, allows users to create customized or "templated" components based on a base component 202. The customized or templated components, referred to hereinafter as "templates", can then be used similar to base components 202. In addition, these templates may be stored to facilitate efficient distribution of templates to others, as explained hereinafter with reference to the distribution pack and the component loader. FIGS. 4A and 4B illustrate conceptually the elements comprising template builder 400 and an exemplary template 420, respectively. The description of template builder 400 will be illustrated in conjunction with the structure of a template to facilitate a better understanding of each concept. Template builder 400 comprises a graphic user interface 402, editor module 404 template installer executable 410 and a distribution pack generator module 406. Template builder 400 is itself a separate application which may be launched on a standalone basis or from a menu contained within user interface of component system 200.

Once invoked, template builder 400 provides a graphic user interface (GUI) 402, which enables users to perform a variety of different actions. GUI 402 may have the following exemplary menu options:

New Template
Open Template
Close
Save
Save as
Delete
Template Properties
Create Distribution Pack
Exit Template Builder GUI 402 may be implemented with one or more objects or classes of objects whose respective methods perform the functions necessary to enable a user to selectively modify a component and to create templates as described hereinafter. Such methods may include those functions for displaying menu options and other visual features such as status bars, tool bars, etc. as well as those functions actually implemented once a menu option is selected. The actual selection and class definitions of such objects being left to the designer, depending on the functions of the template builder desired.

In the illustrative embodiment, template builder 400 may be implemented as an OLE control (OCX) container and, therefore, has three distinct menu states: OCX User Interface (UI) Active, QCX User Interface (UI) Inactive, and OCX Not Present.

The New Template, Open Template, Delete, and Create Distribution Pack menu options are available whenever the OCX is UI-Active, UI-Inactive, or Not Present. The Close, Save, and Exit Template Builder menu options are available only when the OCX is UI-Active or UI-Inactive and disabled if the OCX is Not Present.

Selection of the Save As menu from graphic user interface 402 generates a dialog box in which the user may enter a descriptive name of the template, and instructions for using the template. Selection of the Template Properties menu option generates a listing of the template name, the date of creation of the template, the date of most recent modification to the template, and a descriptive name of the template. The Template Properties menu option also generates a dialog box where the user may enter instructions on using the template, and, select whether such instructions are shown when the template is first used. Selection of the Save As and Template Properties menu options may also generate a check box and password dialog box which, if selected, enable a user to lock a template from further editing or modification until the correct password is supplied.

Selection of the Create Distribution Pack menu option enables users to create a distribution pack file to facilitate distribution of one or more templates. A menu, which may be optionally scrollable, is presented upon selection of the Create Distribution Pack option and allows users to identify one or more templates to be packaged as an executable file. In the absence of a direct selection, graphic user interface 402 may be implemented to highlight a default selection, e.g., the first template listed in the displayed list. The methods used by the template builder of the distribution pack are set forth in greater detail hereinafter. To complete creation of the distribution pack, the user may enter the name of the executable file which contains the previously selected templates, or, a name may be determined by default, e.g. the name of the first selected template.

It will be obvious to those reasonably skilled in the art that graphic user interface 402 associated with template builder 400 may include one or more icons in addition to or in place of the menu options previously described herein, as well as other visual features such as status bars, tool bars, etc. The remaining implementation details of graphic user interface 402 of template builder 400 are within the scope of those reasonably skilled in the arts, in light of the disclosure provided herein with reference to object-oriented technology, the COM and OLE specifications, and the descriptions of menu options and responses contained herein.

Editor module 404 of template builder 400 enables users to selectively modify the functionalities contained within a base component such as component 300 of FIG. 3A. Editor module 404 operates in a manner similar to file based editors, i.e. an original component is opened, changes are made using editor 404, and the modified component saved as a template. In the contemplated embodiment, components which are shipped with the system have a number of predetermined functions which may be selectively modified by the user. For example, a user may initially select a spreadsheet component and, using editor module 404 selectively modify the spreadsheet component's functionality to create a customized component whose function is dedicated to performing mortgage calculations. In this scenario, the functionality of the customized component, i.e. the mortgage calculator is a subset of the original functions supplied with the base component, i.e. the spreadsheet, such customizations being contained within the OLE control itself.

Template builder 400 creates and hosts and instance of a component to be template. Most customization to the component are contained by the actual OLE control comprising the component. The customizations applied by editor module 404 is the ability to save and show "Quicksteps", i.e., help instructions about the template which may be displayed when the component is reused in another context, such as a Lotus Notes document or a MicroSoft Word document. In addition, editor module 404 may provide the ability to lock the template with a password such that further editing of the template contents is not allowed by template builder 400. When used in other application, e.g., Lotus Notes, Word Pro, MicroSoft Word, the template control may still be edited.

Template builder 400 creates templates 420 as described hereinafter with the assistance of the template storage DLL 205. Template storage DLL 205 performs a number of formatting and storage/retrieval methods which manage the storage and registration of template components for component loader 206, template builder 400 and template installer 410. Template storage DLL 205 ensures all additional registry keys and library types are created for template 420 so that spoofing of a template component makes the template component appear to be the base control of the original component as far as the OLE libraries 230 and the container 220 containing the base controller concerned. Template storage DLL 205 may be implemented with one or more objects or classes of objects whose respective methods perform the functions hereinafter.

Template builder 400 further generates creation distribution packs 500 as further described with reference to FIG. 6. Template builder 400 contains an integral part thereof, a template installer executable 410, similar to template installer 210 of FIG. 2. The template installer 410 also comprises an integral part of a distribution pack 500 and may be implemented as a self-executing program which reads a data dictionary at the end of the distribution pack, as explained hereinafter. Template builder 400 includes a copy algorithm for copying template installer 410 into a distribution pack 500 upon request.

Templates and Template Storage

FIG. 4B illustrates the logical structure of template storage 440 and an exemplary template 420 in accordance with the present invention. In the illustrative embodiment, template storage 440 may be implemented as a OLE structured storage file stored on a disk or any suitable memory apparatus. Each template 420 is stored in an ISTORAGE whose name is unique to the machine for that template. The name is assigned by the temporary storage DLL 205 when the template is created and may have the form TEMPLEnnn, where nnn may be a decimal number.

Templates 420 is stored in template storage 440 by template storage DLL 205 in the following manner. A root storage, referred to as "slotmap" contains a binary bit map of used and available slots. Each slot is encoded into a byte (8 bits) in the stream (ISTREAM). The least significant bit of the first byte in the stream is for template 1, while the most significant bit of the first byte in the stream is for template 8, etc. A binary "1" in a bit indicates that the slot is used, a binary "0" indicates that a slot is available. Each storage location off of the root storage contains the following items: 1) an ISTREAM containing information about the templates FMTETC, 2) an ISTREAM containing the contents that an OLE control will write to the storage location, 3) an ISTREAM containing user instructions entered by the creator of the template when saving the template, and 4) an ISTREAM containing information about the subject template, i.e. template information. The data structures, including data type, name, size and description, of such template information are set forth in Table 3 herein. The sizes of the data types listed in Table 3 are further defined by the data structures contained in Table 4.

Generally, a template 420 comprises initialization data and other data needed to enhance, modify or disable the component to be spoofed, as well as data to find and run the spoofed component. Referring to FIG. 4B, each template 420 comprises initialization data 425, user instructions 445, and one or more registry keys or subkeys 450. Initialization data 425 comprises the persistent data representing the state of changes made to the base component 300 with GUI 402 of template builder 400. When template builder 400 saves the template, it instructs the component, to save itself as an OLE structure storage file. Additional data to identify and register the component is also saved in various ISTREAMS and ISTORAGES in the templates ISTORAGE. This ISTORAGE is held inside the template storage file 440 created on the user's machine.

User instructions 445, entered by the author of the template, may be stored in Unicode form in template 420 itself. The Unicode standard is well known and is an international character code standard for information processing. The Unicode standard encompasses the principle scripts of the world and provides the foundation for internationalization and localization of software.

When template 420 is created, template builder 400 and template storage DLL 205 combine to write operating system registry 250. For example, if the Windows operating system is utilized, the Windows registry is used to register component 420 as an OLE control and as a component on the user's machine. The human readable name for the component may be chosen by a user. The remainder of the operating system registry entries are generated by code in the template storage DLL 205 and are stored in both registry 250 and the template 420. To facilitate loading of template 420 onto another system as described hereinafter, a number of registration key or subkey 450 are included with template 420. Each template 420 may have the keys 450A–I, as illustrated in FIG. 4C and further described in Table 2. Keys 450A–C are identical in structure and function to keys 306A–C of component 300, as previously described with reference to FIG. 3B and Table 1. Key 450D contains information indicating that the subject component is a template object. Key 450E contains information that the subject template component is a control which may be safely scripted. Key 450F contains information indicating that the subject template component is a control that is safely initializable for persistent data in an object-oriented environment. Key 450G contains information indicating the CLSID of the object upon which the subject template is based. Key 450H contains information indicating the name of the storage object in template storage file 440 where initialization data 425 for the template component may be located. Finally, key 450I contains information identifying the CLSID of the general type library for the template.

Specifically, key 450I "points" to the GUID found under the TYBELIB root to find the type library for the OLE automation which will be a new TYBELIB library derived from the base controls type library. As such, the base controls, i.e., the components registry entries will be duplicated in a new registry entry with a new TYBELIB file. The new TYBLIB file enables operations of the component to be enhanced, modified, or disabled. Spoofing the TYBELIB ensures proper operation of the template control in an OLE automation environment.

Distribution Pack

Figure 5:
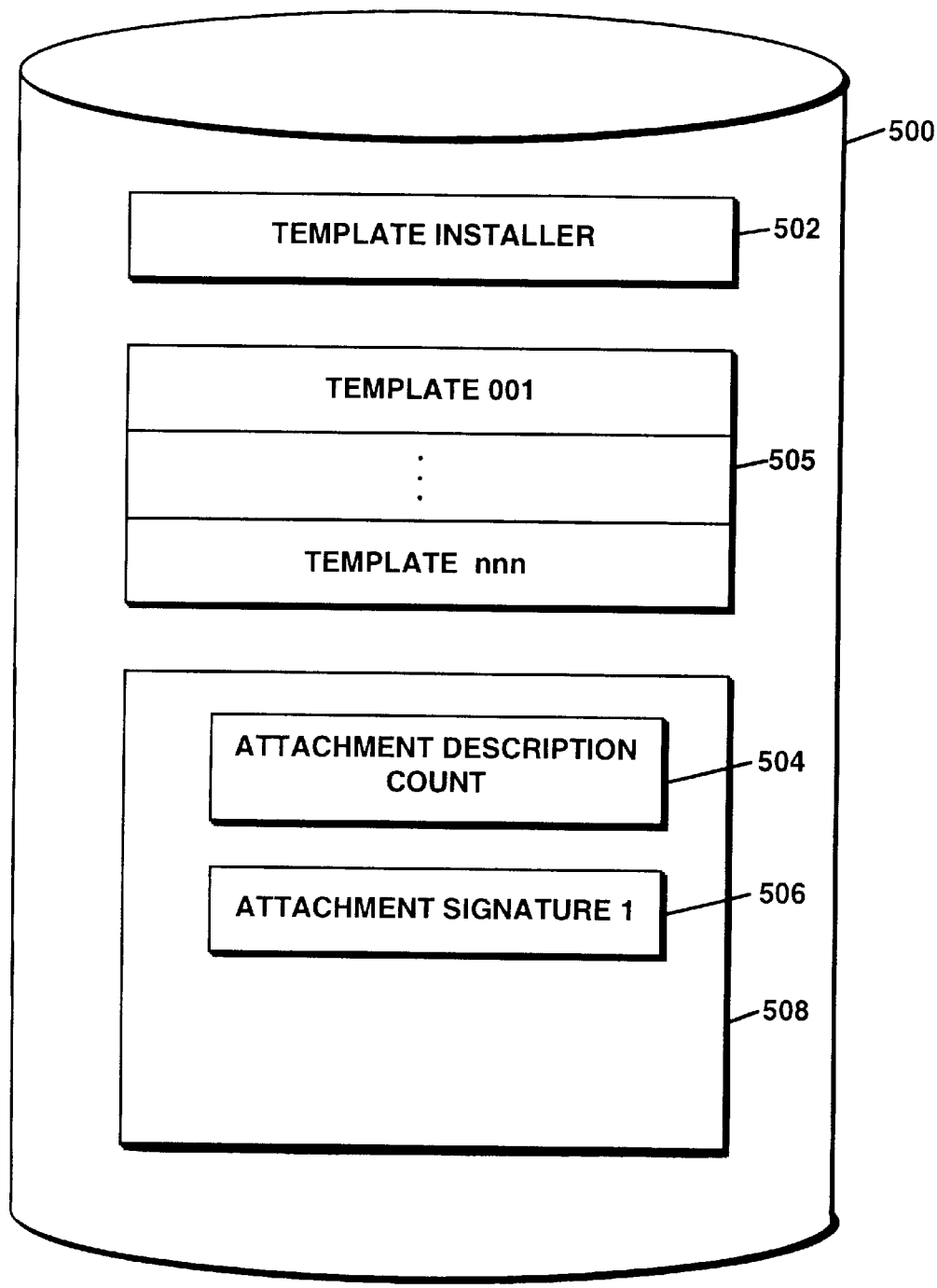
FIG. 5 is a conceptual block diagram of a component distribution pack in accordance with the present invention.

As stated previously, one of the menu options available from graphic user interface 402 of template builder 400 is the Create Distribution Pack option which, when selected, causes template builder 400 to create a template distribution pack 500, as illustrated in FIG. 5.

Distribution pack 500 may be implemented as an executable program including an OLE structured storage file containing the data for one or more templates, as previously described. The distribution pack 500 may be stored on a medium for physical distribution or election downloading over a network. When executed, distribution pack 500 installs, on the user's machine, the templates contained therein and any other data items appended to the templates. As illustrated in FIG. 5, the distribution pack 500 comprises a template installer executable 502 one or more template(s) 505 and a data dictionary 508. Template installer 502 is a self-executable file, similar to template installer 410 described previously, which is copied into distribution pack 500 by template builder 400. Template(s) 505 have that same format as described with reference to FIG. 4B.

Generally, template builder 400 generates a distribution pack 500 by copying the template installer executable 502 into the distribution pack, copying those templates specified by a user from template storage 440 into the distribution pack, and generating an attachment signature for the template(s) file containing the attachment signatures forming data dictionary 508. Distribution pack 500 is capable of installing one or more items appended to it by reading data dictionary 508 at the end of the template installer executable 502. Specifically, data dictionary 508 comprises an attachment description count 504 and one or more attachment signature(s) 506. Attachment description count 504 may be implemented as a variable-sized integer, the value thereby being determined by the number of attachment signatures. Attachment description count 504 has the data structure as set forth in Tables 7 and 8 herein. Attachment signatures 506, have the format and data structures, as set forth in Table 5 and 6 herein.

Each attachment description 504 may be implemented using the following C++ code example:

```
typedef struct_tagAttachmentDescription
{AttachmentType    m_Type; // type
DWORD m_dwFileOffset;   // offset in the file from BOF
DWORD m_dwLength:       // length of the attachment in BYTEs
OLECHAR m_Name [_MAX_PATH];    // name of file to detach to}
    AttachmentDescription;
```

Each attachment type implemented in the above code example may be implemented using the following C++ code example:

```
struct AttachmentType
Description: an attachment type
Assumes: Preceding the AttachmentSignature in a template installer is
a variable number (AttachmentSignature.m_dwNumAttachments) of
AttachmentDescription structures. The AttachmentType of an
AttachmentDescription describes the type of attachment, which also
implies the install-time behavior.
typedef enum_tagAttachmentType
{TINSTAR_FILE = 1,          // yes, these can recurse
INSTALLEXE_FILE = 2,        // recurses, but does not delete
                               itself
TAC_BLOCK = 3,              // a Lotus Terms & Conditions
                               block
SIGNATURE_BLOCK = 4,        // a Lotus Signature block
DOCFILE_FILE = 5,           // a DocFile (Use StgOpenDocfile
                               to open)
TEMPLATE_DOCFILE_FILE = 6,  // a DocFile of Templates (Use
                               StgOpenDocfile to open)
BENSTORE_FILE = 7,          // a Bento storage file (Use
                               StgOpenBento to  open)
TEMPLATE_BENSTORE_FILE =    // a Bento storage file of
8,                             Templates  (Use StgOpenBento
                               to open)
```

-continued

```
OCX_FILE = 9,               // a generic OCX - install it and
                               call DllRegisterServer
DLL_FILE = 10,              // a generic DLL - install it and if it
                               is self-registering call
                               DllRegisterServer
EXE_FILE = 11,              // a generic EXE - install it and
                               run with - Register on command
                               line
OLE_DLL_FILE = 12,          // an OLE inproc server and call
                               DllRegisterServer
OLE_EXE_FILE = 13,          // an OLE container or server
                               EXE and run with - Register on
                               command line
REG_FILE = 14               // a .REG file - register it
LC_OCX_FILE = 15,           // a Lotus components OCS -
                               install it and call
                               DllRegisterServer
}
```

Attachment Signatures 506 may be implemented using the following C++ code example:

```
typedef struct_tagAttachmentSignature
{// a pair of magic numbers to "tag" the file
DWORD   m_dwMagic1;
DWORD   m_dwMagic2;
// size of this struct
DWORD   m_dwSize;
// version of this struct
DWORD   m_dwVersion;
//number of variable-sized attachments that precede us in the file
DWORD   m_dwNumAttachments;
// a title for this pack
OLECHAR   m_szTitle [ATTACHMENT_MAXTITLE];
// an MD-5 signature
BYTE      m_MessageDigest [ATTACH-
MENT_SIGNEDBYTES_SIZE];
}
AttachmentSignatures;
```

Figure 6:
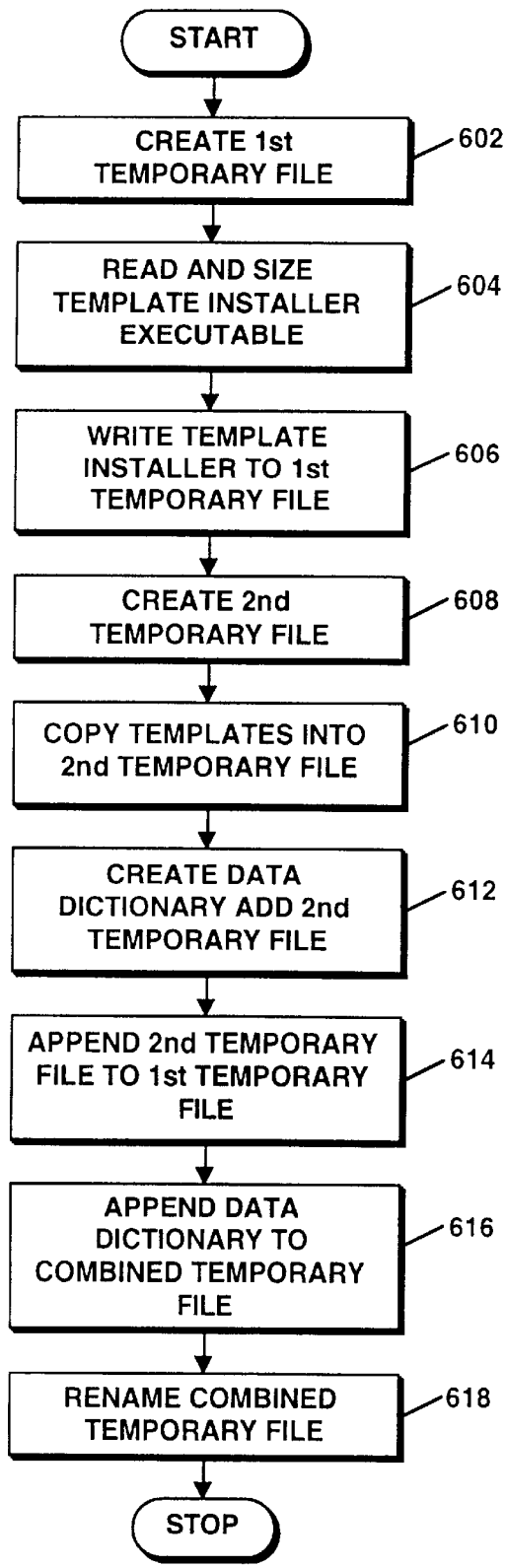
FIG. 6 is a flow chart illustrating the method steps for creating a component distribution pack in accordance with the present invention.

FIG. 6 is a flow chart illustrating the basic process steps used by template builder 400 to create a distribution pack 500 in accordance with the present invention. The coding of the method steps of the illustrated flow chart into instructions or objects having analogous method functions suitable for control of the central processing unit of the user's machine will be understood by those having ordinary skill in the art of programming.

As illustrated in FIG. 6, the process by which the template builder executable 400 creates a distribution pack starts with the step of creating a first temporary file, as illustrated by process step 602. Next, the template installer executable 502 is read from the template builder executable and the size of the template installable executable determined, as illustrated by process step 604. The template installer executable 502 is then written to the first temporary file, as illustrated in procedural step 606. Next, a second temporary file is created as an OLE structure storage, file, as illustrated by procedural step 608. Next, template storage DLL 430 copies one or more selected templates from template storage file 440 to the second temporary file, as illustrated by procedural step 610. A data dictionary 508 is then created in memory and the contents of the second temporary file appended thereto, as illustrated by procedural step 612. The data dictionary indicates to the template installer executable 502 what is appended to the data dictionary and how to handle such appendages. Next, the second temporary file, i.e., the OLE structure storage file, is appended to the first temporary storage file, i.e. the template installer executable 502, to form a composite temporary file, as illustrated by procedural step 614. The data dictionary 508 is then appended to the composite temporary file, as illustrated by procedural step 616. Finally the composite temporary file is renamed to the name of the distribution packet, as selected by the user, as illustrated by procedural step 618.

Once a distribution pack 500 is generated by template builder 400 in accordance with the previously described method, the distribution pack, in conjunction with component loader 206 and template storage DLL 205 is capable of installing templates from an embedded storage file within the distribution pack into a registered template storage file on a different system using the code within template storage DLL 205.

Component Loader

Component loader 206, performs three functions in accordance with the illustrative embodiment. First, the component loader will load, verify and check the license and integrity of a component. Second, the component loader extends the function of the template component to be loaded through a process known as aggregation, which allows additional interfaces to be added to an existing object interface without modifying the object itself. Third, the component loader loads the component. These three functionalities are described in greater detail below.

In order to utilize template 420 generated by the template builder 400, the system must have installed thereon the component loader 206 and the template storage DLL 205. Component loader 206 contains code that recognizes the load of a component as the load of a template 420 and finds the template storage DLL 205 that will enable reading of the template initialization data 425 from the distribution pack.

Component loader 206 loads, verifies and checks the license of a component 208 by replacing in the registry 250 the InProcessServer32 entry, i.e. key 450A, for the component with the full path name to component loader 206 and adding additional registry keys 450B–J, as previously described, that will let the component loader then load the correct OLE control. Component loader 206 provides default functionality to a component using OLE aggregation. Specifically, component loader 206 adds a secure loading interface to a generic OLE control, which ensures that the OLE control is uncorrupted and properly obtained. Component loader 206 utilizes digital signature verification and license verification to establish secure loading of an OLE control. Specifically, a component includes a digital signature, similar to digital signature 304 previously described, which ensures that the OLE control loaded and OLE control installed are one and the same. The digital signature further ensures that the component that was installed was produced by the vendor of the component, either directly or indirectly, as the component is signed by the vendor with a private key. Specifically, the component vendor may sign the component through use of a public/private key encryption technology, as previously described. Verifier module within the component loader 206 ensures that the component is properly licensed, i.e. is used within the terms and conditions agreed to at the time of installation. The license itself may comprise a number of terms and conditions implemented as data blocks stored in system registry 250, such data blocks being verifiable through a public/private key encryption technology.

A number of specific licensing techniques may be utilized to ensure proper licensing of a component or template. For example, components supplied with the component system 200 may be provided with specific mechanisms to automatically determine the occurrence of a certain event, i.e. counters and time-bombs. Such mechanism may comprise a soft time-bomb, i.e. a component is licensed to work for a specified time after installation of the component. Alternatively, a component may be configured with a hard time-bomb, i.e. the component is licensed to work up to a specific stop date regardless of the date of installation. Such a mechanism may alternatively comprise a usage count, i.e. the component is licensed to work for a specified number of times (usages) after installation. The design and structure of such licensing enforcement mechanisms is within the scope of those reasonably skilled in the relevant arts and will not be described hereinafter for brevity.

For each component that is loaded by component loader 206, the component loader 206 looks up the public key of the vendor stored in a certification list and validates the signature. If a component's certification is not on the list, it is assumed that the component is unlicensed and therefore is not loaded and its use is unauthorized. If the vendor's certificate is on the list, but the signature does not match, there is a possibility that the component has been damaged. In such instance, component loader 206 may, optionally, delete or disable the component as there is a possibility that the component is carrying a computer virus. Finally, if the component vendor certificate is in the list and the digital signature within the component matches, it may be assumed that the license for the component is valid and that the component is safe to use. At such point, a flag within the component's data space within registry 250 may be set and checked on all subsequent calls to the component. When a component has simply been copied from one user to another, component loader 206 will detect the lack of a vendor certificate and will prevent loading of the component and subsequent use of the copied component's functionality. In any event, when container 220 either does not support or ignores the test results from the component loader 206, the previously mentioned flag within the component's data space will not be set and all subsequent calls to the component will fail, and, possibly, cause a message to be displayed indicating "unauthorized use." The methods performed by the component loader 206 to verify the license and signature are set forth in greater detail with reference to FIGS. 7–8B.

In addition to the verification functions described above, component loader 206 functions as the registered server for the new OLE controls representing a template 420. Loader 206 "spoofs" the original OLE control and aggregates itself on top of the original OLE control, loading the template data in conjunction with template storage DLL 205, as appropriate. In the case of an OLE control, the registry 250 is used by the OLE 230 libraries to locate and run a server for a given registry GUID. Component loader 206 registers itself as the server for all components and saves the knowledge of the actual component to be run. When an application uses OLE libraries 230 to create a new instance of a registered component, the component loader 206 is instanced instead of the component. Component loader 206 then utilizes information about the actual component to "wrap" or "spoof" the component. This method of wrapping is achieved using the OLE Aggregation properties defined by the COM specification so that method calls to the object presented to OLE 230 as the instanced component are selectively directed to the actual component. The component loader 206, however, reserves the right, by virtue of being the actual software entity called by the OLE 230, of changing, enhancing or disabling the results of a method call. As such, spoofing is different from "data stuffing." In data stuffing, data is read into the component transparently to an outside caller. With spoofing, additional behaviors are added or enhanced to the component in the form of user instructions, i.e. Quicksteps. The aggregation performed by component loader 206 may be used to enhance, disable or modify any method call exposed by a component on any COM interface, beyond what is currently done by component loader 206. For example, a new type library, needed by the OLE automation builders, such as Lotus Notes and Microsoft Visual Basic, is created by the template storage DLL 205 and registered in the registry 250 for a specific template. Component loader 206 can then be used to enhance, disable or modify those functions available to the OLE automation for the base component of the specific template.

Figure 9:
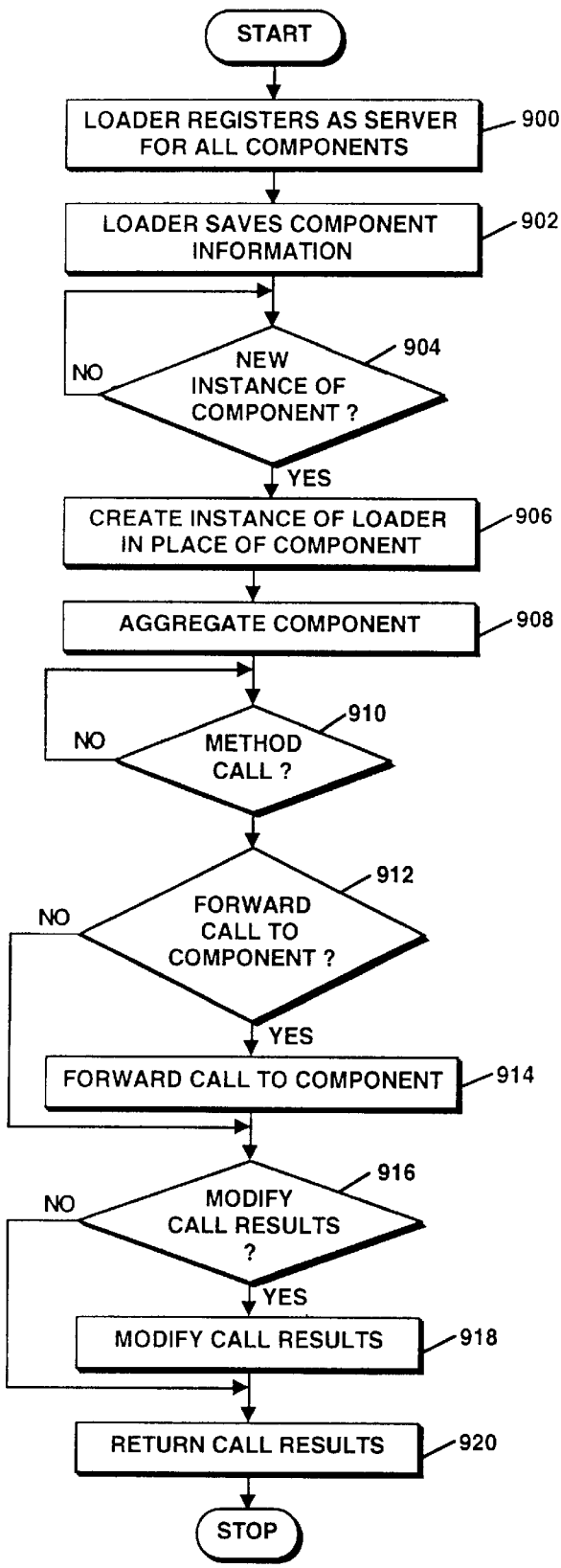
FIG. 9 is a flow chart illustrating methods performed by the component loader in accordance with the present invention.

The spoofing process performed by component loader 206 as defined above, and as further defined with reference to FIG. 9, may utilize any of the following OLE data structures and objects, as set forth in the OLE 2.0 specification, to perform the spoofing methods set forth herein.

OLESTR
GUID
IClassFactory
CLSID
IID
IUnknown
IPersistentStreaminit
IPersistentStorage
Istorage
IStream
HRESULT
IOleObject
IDispatch
DISPPARAMS
VARIANT
EXCEPINFO
LCID
ITypeInfo Component loader 206 works in conjunction with template installer 502 to unload templates 505 from distribution pack 500 into a storage file on the recipient component system on which component loader 206 is executing. Template installer 502 loads templates 505 which have been formatted by template storage DLL 205 according to the following method. First, template installer 502 seeks the end of the file of the last attachment signature 506 in distribution pack 500. Next, template installer 502 reads the attachment signature(s) 506 and verifies the attachment signature using an appropriate call, such as a CheckAttachmentSig call. Next, all of the attachment description(s) 504 within data dictionary 508 of the distribution pack 500 are read. Finally, template installer 502 loops through all attachment description(s) 504 reading the file(s) in the attachment descriptions and performing the operations required by the attachment description type fields specifies, including launching the template installer executable types as processes.

Component loader 206 utilizes the methods performed by template storage DLL 205 to obtain the OLE ISTORAGE containing the data of a template. Component loader 206 then utilizes the template data to initialize the base controls data, i.e. the component's data. To achieve this, component loader 206 inserts the template data into the component using methods in the IDATAOBJECT (IDATA Object.SetData) to pass the OLE ISTORAGE. The IDATAOBJECT is obtained from the component using the Queryinterface defined by the COM specification. As a result, the IDATAOBJECT is spoofed by component loader 206 prohibiting a template based on a component having either an invalid signature or certificate from loading, since the certification thread will either cause the IDATAOBJECT method to fail or the component to be closed.

Component loader 206 is implemented with a dynamic link library module which serves as a standard unit process server. The dynamic link library has two exports and implements an object ICLASSFACTORY and a generic object to aggregate all loaded components. The ICLASSFACTORY object is a master class factory for all components loadable by the component loader 206. By providing a generic implementation of the ICLASSFACTORY, the component loader DLL can intercept all calls to create an instance and aggregate default functionality onto a component.

Figure 7:
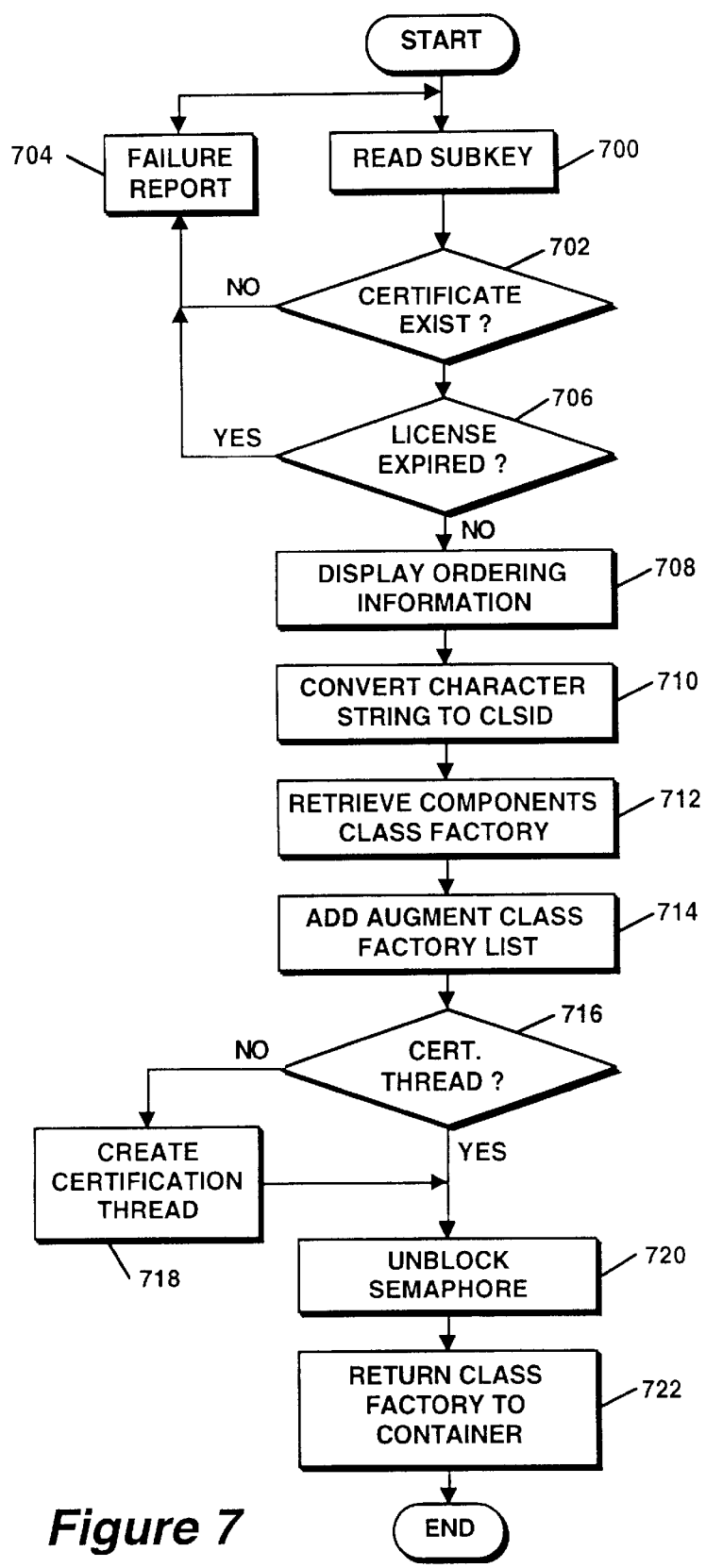
FIG. 7 is a flow chart illustrating methods performed by the component loader in accordance with the present invention.

When a container 220 incorporates a component 202, the component loader DLL will be loaded and call DLLGetClassObject. The algorithm performed by the methods of the DLLGetClassObject is described with reference to FIG. 7. The coding of the method steps of the flow chart of FIG. 7 into instructions or objects having analogous method functions suitable for control of the central processing unit of the user's machine will be understood by those having ordinary skill in the art of programming. First, a subkey, such as HKEY_CLASSES_ROOT\CLSID\{CLSID}\CLSID, is read from registry 250 to determine the real component CLSID, as indicated by process step 700. Next, a determination is made as to whether a certificate exists by reading the appropriate registry entry such as HKEY_CURRENT_USER\Software\Lotus\LOCX\{szRealCLSID}, as indicated by decisional block 702. If no certificate exists, the user will be notified and a failure message returned, as indicated by procedural block 704. If a certificate does exist, a determination is made as to whether or not a license period has expired, as indicated by decisional step 706. If the license period has expired, the user is informed and a failure message returned, as illustrated by procedural step 704. If the license period has not expired, a message may be displayed with all information necessary for the user to order the component, as illustrated in procedural block 708. Next, in procedural block 710, the relevant character string from the registry is converted to a CLSID. The component loader 206 then calls the GetClassObject to retrieve the real component's class factory, as indicated by process 712. Next, the component loader's class factory references the component class factory and adds itself to a list of loaded class factories, as indicated in procedural step 714. A determination is then made if a certification thread exists in decisional block 716. If no certification thread exists, one is created in procedural step 718, as indicated in FIG. 7. In procedural step 720, the certification thread blocking a semaphore is released forcing the thread to process all loaded objects, as indicated by procedural step 720. Next, the component loader DLL class factory is returned back to the container 220, as indicated by procedural step 722.

The certification thread may periodically go through the list of all class factory objects and certify the component. In this manner, certificates and licenses may be checked periodically to ensure that the time trial licenses are in force.

Figure 8A:
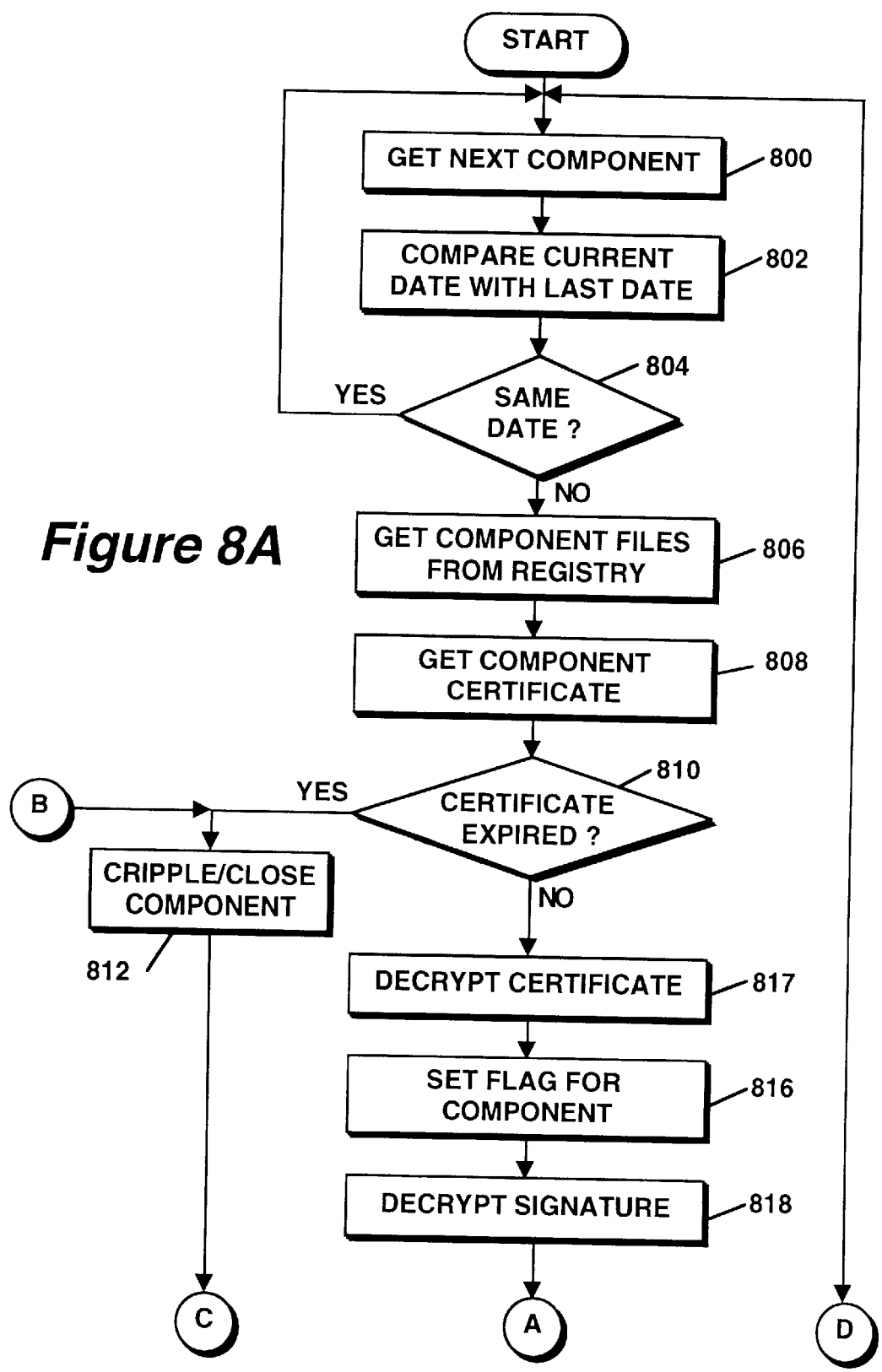
FIGS. 8A–B collectively form a flow chart illustrating the methods performed by the component loader in accordance with the present invention.
Figure 8B:
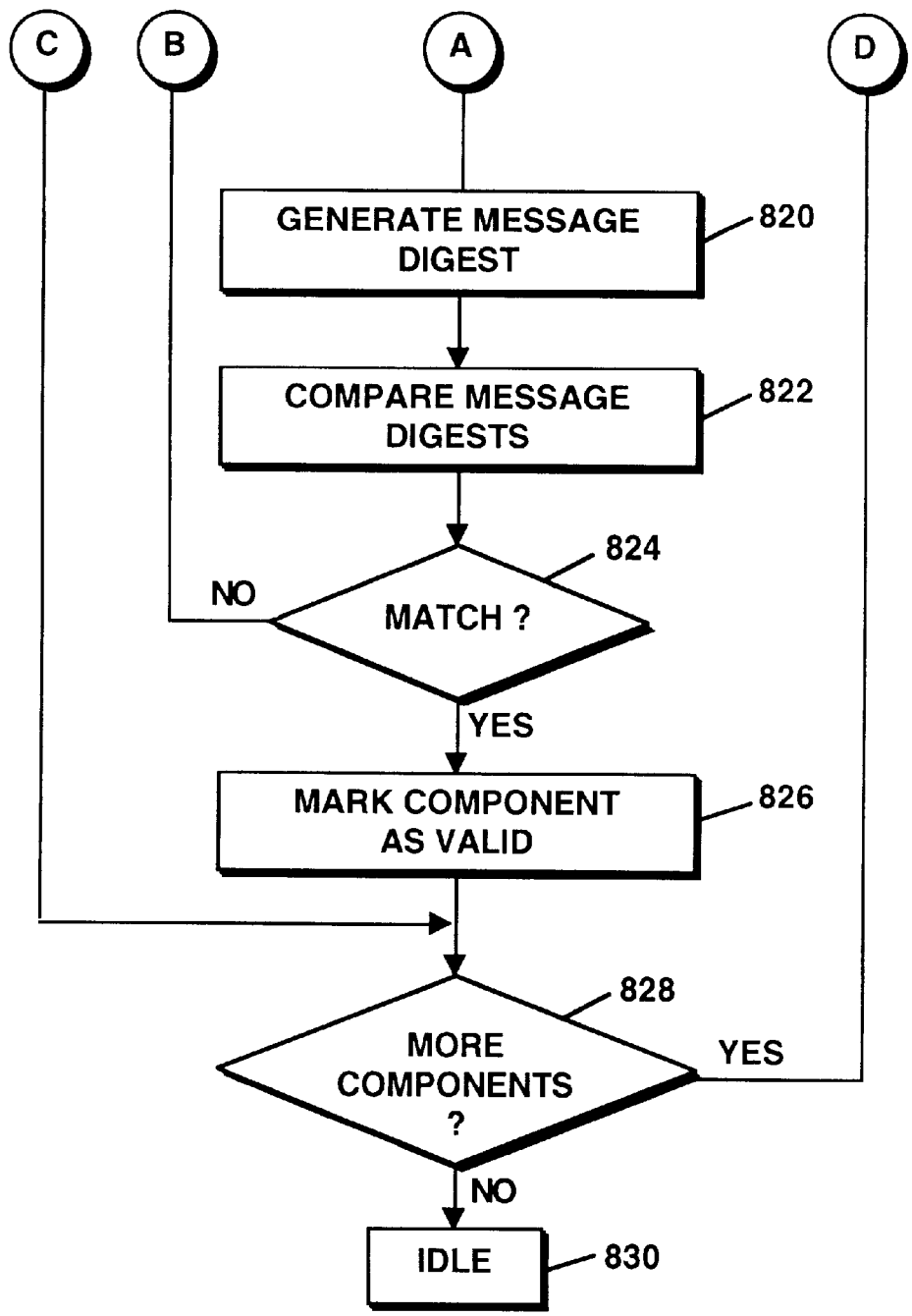

The method performed by the certification thread is described with reference to the process steps illustrated in FIGS. 8A–B. The coding of the method steps of the illustrated flow chart into instructions or objects having analogous method functions suitable for control of the central processing unit of the user's machine will be understood by those having ordinary skill in the art of programming. First, for each object loaded by component loader 206, the certification thread compares the current date with the date on which that object was last checked, as illustrated by process blocks 800 and 802. If the dates are the same, the certification thread advances to the next object, as illustrated by decisional block 804. If the dates are dissimilar, the certification thread obtains the components file name from the InProcessserver32 registry entry of registry 250, as illustrated by process step 806. Next, the component's certificate is obtained from the entry of registry 250, such as HKEY_CURRENT_USER\SOFTWARE\LOTUS\LOCX\{CLSID\ as indicated by process step 808. The certification thread then determines if the certificate has expired, as illustrated by decisional block 810. If the certificate has expired, the certification thread cripples the component by forcing all future calls to certain objects, such as ICLASSFACTORY ITYPEINFOC, and IPERSISTORAGE to return an error message. Alternatively, the component may be forced into immediate closure by an appropriate method call such as OLEObject::Close, as illustrated by procedural block 812. If the certificate for the component has not expired, the certification thread decrypts the certificate, as illustrated by procedural block 814. Next, a flag may be set in the component's name space, e.g. the component's dynamic link library to let the system know that component resources may be accessed, as illustrated by procedural step 816. Next, a signature resource at the end of the component file is located and the resource decrypted using the vendor's public key in the component certificate, as illustrated by process 818. A message digest of the component dynamic link library is then generated, as illustrated by step 820. Next, the message digest generated is compared with the message digest stored in the component dynamic link library, as illustrated by procedural step 822. If the message digests are the same, as illustrated by decisional block 824, the certification thread marks the object as valid, as illustrated by procedural block 826. Alternatively, if the message digests are dissimilar, the component is crippled or closed, as illustrated in procedural block 812. If more objects exist, the certification thread will advance to the next object, as illustrated by decisional block 828, otherwise, the certification thread may remain dormant for a predetermined period of time, as illustrated by process block 830.

With the above described method, certification thread verifies that the digital signature of a loaded component and blocks operation of the component if the digital signature fails. Further, the certification thread verifies the duration of the license associated with the component and blocks operation if the license has expired.

The methods performed by component loader 206 in spoofing a component are illustrated with reference to FIG. 9. The coding of the method steps of the flowchart in FIG. 9 into instructions or objects having analogous method functions suitable for control of the central processing unit of the user's machine will be understood by those having ordinary skill in the art of programming. First, component loader 206 registers as the server for all components with registry 250, as illustrated by procedural step 900. Component loader 206 next saves information i.e. the initialization information 425, user instruction 445 and key 450, about the component to be utilized, as illustrated by procedural step 902. When a container or application utilizes OLE libraries 230 to create a new instance of the component, a new instance of the component loader 206 is created instead, as illustrated by decisional step 904 and procedural step 906. Next, component loader 206 uses the persistent data of the component to wrap or spoof the component using OLE Aggregation to create a composite object, as previously described and as illustrated by procedural step 908. Next, when a method call to the component is presented to the OLE library 230, component loader 206 detects the method call and selectively determines, based on the component loader's knowledge of the templated component, whether or not the call should be selectively forwarded to the component, as illustrated by decisional steps 910 and 912. If component loader 206 determines that the method call may be forwarded to the component, the call is forwarded, as illustrated by procedural step 914. Otherwise, component loader 206 determines whether or not the call results should be modified directly, or as returned from the component, as illustrated by decisional block 916. If no changes in the behavior of the base component are required, the method call results are returned, as illustrated by the "NO" branch of decisional block 916 and procedural block 920. Otherwise, component loader 206 enhances, disables or modifies the results of the method call as illustrated by procedural step 918 prior to returning the call results in procedural step 920, as illustrated.

Utilizing the methods and processes outlined above, applications or other entities making method calls to a templated component are actually interacting with the component loader 206 which utilizes the persistent data of the template and the functionality of the base component being spoofed to appear as the templated component. For example, a method call to the previously described mortgage calculator component would actually be received by the component loader which then enhances, modifies or changes the behavior of the base spreadsheet component from which the mortgage calculator component was derived. Using the state of the modification to the persistent data stored in the template, i.e. the changes which distinguish the behavior of the mortgage calculator from the spreadsheet, enables the component loader to appear as the mortgage calculator even though a mortgage calculator component does not exist on the component. In this manner, multiple users having the same base components or their system may receive and utilize templates of customized components. The component loader on the recipient system utilizes the template information and the base components to recreate the behavior of the customized components without the necessity to have the complete customized component distributed. As previously described, the component loader further facilitates validation of digital signatures and licensing as well.

Source and Recipient Component Systems

To further illustrate the advantages of the inventive component system described herein, the following examples are provided with references to FIG. 2. A "source" system, i.e., a component system capable of customizing components and generating distribution packs, has the configuration as illustrated by component system 200 of FIG. 2. Template builder 204 is required for a source system to generate distribution pack 208, in the manner previously described. The distribution pack 208 may then be distributed to a recipient system, i.e. a component system capable of utilizing the templated components generated by the source system. A recipient system has a configuration similar to component system 200 of FIG. 2, except that template builder 204 and template installer 210 are not required to utilize the contents of distribution pack 208. In order to fully enjoy the benefits of the templates contained in the distribution pack, the recipient system need only have the component loader 206, template storage DLL 205, and base component(s) 202. Upon receipt of a distribution pack 208 by the recipient system, a template storage file 212 is generated by component loader 206 which, in conjunction with template storage DLL 205, utilizes the templates to spoof the base component 202, as required. Templates 212, in conjunction with base component 202 and component loader 206 enable the user of the recipient system to utilize the behavior of the customized templated components without the need to have the actual customized component in its entirety distributed to the recipient system.

To further illustrate this concept, the following scenario is provided with reference to the previously described example. A base component representing a spreadsheet is assumed to be installed and loaded on both the source component system and the recipient component system. A template representing modifications and persistent data to the base spreadsheet component, which modify the spreadsheet behavior into a mortgage calculator component, are generated by the template builder on the source system and distributed to the recipient system in the form of a distribution pack. The component loader in the recipient system utilizes the mortgage calculator in the distribution pack in conjunction with the template storage DLL of the recipient system. When method calls are received for the mortgage calculator, the component loader utilizes its knowledge of the mortgage calculator in conjunction with the methods of the base spreadsheet component and selectively modifies the behavior of the spreadsheet component in accordance with the template information to recreate the behavior characterized by the mortgage calculator component.

The reader will appreciate that the inventive component system described herein enables the utilization of numerous customized components by creating, formatting and storing only the modifications to those components, i.e. templates which, when combined with the original base components, allows the behavior of the customized component to be realized in an object-oriented environment.

A software implementation of the above described embodiment(s) may comprise a series of computer instructions either fixed on a tangible medium, such as a computer readable media, e.g. diskette 142, CD-ROM 147, ROM 115, or fixed disk 152 of FIG. 1, or transmittable to a computer system, via a modem or other interface device, such as communications adapter 190 connected to the network 195 over a medium 191. Medium 191 can be either a tangible medium, including but not limited to optical or analog communications lines, or may be implemented with wireless techniques, including but not limited to microwave, infrared or other transmission techniques. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, preloaded with a computer system, e.g., on system ROM or fixed disk, or distributed from a server or electronic bulletin board over a network, e.g., the Internet or World Wide Web.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. Further, the methods of the invention may be achieved in either all software implementations, using the appropriate processor instructions, or in hybrid implementations which utilize a combination of hardware logic and software logic to achieve the same results. Such modifications to the inventive concept are intended to be covered by the appended claims.

TABLE 1

| Key Name | Description |
| --- | --- |
| InProcServer32 | full path to component loader |
| Locx32 | full path to OLE control |
| Vendor ID | identifies the component vendor |
| Script Status | marks this as a controls that is safely scriptable |
| Initialization Status | marks this as a controls that is safely initializable from persistent data |

| Key Name | Description |
| --- | --- |
| InProcServer32 | full path to component loader |
| Locx32 | full path to real OLE control |
| Vendor ID | identifies the Component Vendor |
| Template Status | marks this as a Templated Object |
| Script Status | marks this as a controls that is safely scriptable |
| Initialization Status | marks this as a control that is safely initializable from persistent data |
| BaseGUID | the CLSID of the object that this template is based on |
| StorageName | the name of the storage in Template Storage file where the initialization data is |
| Typelib | CLSID of the general type library |

TABLE 3

| Data Type | Name | Size in bytes | Description |
| --- | --- | --- | --- |
| DWORD | m_dwSize | 4 | size of this structure |
| DWORD | m_dwVersion | 4 | version number of this structure |
| CLSID | m_CLSID | sizeof(CLSID) | CLSID of this template |
| CLSID | m_BaseGUID | sizeof(CLSID) | CLSID of the OCX being spoofed (the base GUID) |

TABLE 3-continued

| Data Type | Name | Size in bytes | Description |
|---|---|---|---|
| OLECHAR | m_oleStorageName | MAX_STORAGENAME* sizeof(OLECHAR) | IStorage name of the data for this template |
| OLECHAR | m_oleDisplayName | MAX_DISPLAYNAME* sizeof(OLECHAR) | User-displayed name of this template |
| DWORD | m_dwRegInfoLength | 4 | length of the registration data that follows in OLECHARs |
| BOOL | m_bShowInstructionsWhenInserted | 4 | show instructions (QuickSteps) for this template when inserted? |
| BOOL | m-bHasGUID | 4 | does this template have a GUID assigned to it yet? |
| OLECHAR | m_oleProgID | MAX_PROGID* sizeof(OLECHAR) | ProgID for the template (script name) |
| CLSID | m_clsidTypelib | sizeof(CLSID) | CLSID for the type library created from the type library associated with m_BaseGUID |
| BOOL | m_bHasTypelibID | 4 | has a Typelib CLSID been associated yet? |
| OLECHAR | m-olePassword | MAX-TEMPLATE_PASSWORD* sizeof(OLECHAR) | Unicode password for this template (all Unicode NULL if no password) |

| Name | Value | Description |
|---|---|---|
| MAX_CLID | 256 | maximum size of a CLSID string |
| MAX_DISPLAYNAME | 128 | maximum size of a Display name string |
| MAX_STORAGENAME | 128 | maximum size of a Storage name string |
| MAX_PROGID | 40 | maximum size of a ProgID name stnng (including NULL) |
| MAX_TEMPLATE_PASSWORD | 32 | maximum size of a Password string (including NULL) |

| Data Type | Name | Size in bytes | Description |
|---|---|---|---|
| DWORD | m_dwMagic1 | 4 | a pair5 of magic numbers to "tag" the file, value is ATTACHMENTSIGNATURE_MAGIC 1 |
| DWORD | m_dwMagic2 | 4 | (so as to properly identify the file as a TINSTSAR file, value is ATTACHMENTSIGNATURE_MAGIC 1 |
| DWORD | m_dwSize | 4 | size of this structure, value is 196 |
| DWORD | m_dwVersion | 4 | version of this structure, value is ATTACHMENTSIGNATURE_VERSION |
| DWORD | m_dwNumAttachments | 4 | the number of AttachmentDescription structures that precede this data dictionary in the file |
| OLECHAR | m_szTitle | 160 | ATTACHMENT_MAXTITLE Unicode characters for the title of this set of attachments constituting a Distribution Pack |
| BYTE | m_MessageDigest | 16 | ATTACHMENT_SIGNEDBYTES_SIZE bytes for an MD5 signature |

| Symbol Name | Value | Description |
|---|---|---|
| ATTACHMENT_MAXTITLE | 80 | Maximum size of a title string including the NULL |
| ATTACHMENT_SIGNED BYTES_SIZE | 16 | Number of bytes in the MD5 signature block |
| ATTACHMENTSIGNATURE_MAGIC1 | (DWORD) | "magic" value #1 used to tag the data dictionary at the end of a TINSTAR file |

-continued

| Symbol Name | Value | Description |
|---|---|---|
| ATTACHMENTSIGNATURE_MAGIC2 | (DWORD) | "magic" value #2 used to tag the data dictionary at the end of a Template Installer file |
| ATTACHMENTSIGNATURE_VERSION | (DWORD) 1L | version number for attachment data dictionary |

| Data Type | Name | Size in bytes | Description |
|---|---|---|---|
| Attachment Type | m_Type | 4 | Type of attachment; only values from the enumeration. AttachmentType are valid. AttachmentType is the attachment type, and the AttachmentType is an AttachmentDescription describes the type of attachment, which also implies the install-time behavior. Note that once value for types are established in this enum, they must not be changed. New types must be added to the end of the enum list. |
| DWORD | m_dwFileOffset | 4 | offset in the file of the attachment data from the beginning of the file (BOF) |
| DWORD | m_dwLength | 4 | length of the attachment in BYTEs |
| OLECHAR | m_Name | 520 | the name of file to detach to, _MAX_PATH Unicode characters (_MAX_PATH is defined to be 260) |

| Attachment Type | ID | Description | Installation Instructions |
|---|---|---|---|
| TEMPLATE INSTALLER_FILE | 1 | The attachment is an executable based on TEMPLATE INSTALLER.EXE. Implies that Template Installer files can also "recurse" | 1. Install as a temporary file. 2. Create a process based on that temp file. 3. Wait for that process to finish executing and then delete the temp file. |
| INSTALLEXE_FILE | 2 | The attachment is an executable: executes, but does not delete itself | 1. Install in the current directory. 2. Create a process based on that file. |
| TAC_BLOCK | 3 | a Lotus Terms & Conditions block | 1. Register the CLSID in the T&C block in the Registry under the key HKEY_CURRENT_USER/Software/Lotus/LOCX |
| SIGNATURE_BLOCK | 4 | a Lotus Signature block | obsolete |
| DOCFILE_FILE | 5 | a DocFile (Use StgOpenDocfile to open) | 1. Install in the current directory |
| TEMPLATE_DOCFILE-FILE | 6 | a DocFile of Templates (Use StgOpenDocfile to open) | 1. Detaches this attachment as a temp file and marks it for deletion. This file is created as an OLE Structured Storage suitable for use by Template Storage DLL, and is called a Template Root Storage. 2. Opens the current Template Root Storage for updating. 3. Creates a progress window. 4. Enumerates each of the templates in the temp file Template Root Storage, performing steps 5 through 7. 5. Updates the progress window. |

-continued

| Attachment Type | ID | Description | Installation Instructions |
|---|---|---|---|
| | | | 6. Checks to see if the ProgID or Template names are used before attempting install, and prompts the user for overwrite if they are. |
| | | | 7. Installs the template. |
| | | | 8. Deletes the temp file |
| | | | 9. If instructed to do so by the presence of a -D or a -d on the command line, marks the Distribution Pack for a "lazy delete" |
| BENSTORE_FILE | 7 | a Bento storage file (Use StgOpenBento to open) | 1. Install in the current directory. |
| TEMPLATE_BENSTORE_FILE | 8 | a Bento storage file of Templates (Use StgOpenBento to open) | 1. Install as per TEMPLATE_DOCFILE_FILE, except use Bento to open. |
| OCX_FILE | 9 | a generic OCX | 1. Install in the current directory. |
| | | | 2. call LoadLibrary on it |
| | | | 3. call DllRegisterServer |
| DLL_file | 10 | a generic DLL | 1. Install in the current directory. |
| | | | 2. check to see if it is self-registering (if not, skip all remaining steps) |
| | | | 3. call LoadLibrary on it |
| | | | 4. call DllRegisterServer. |
| EXE_FILE | 11 | a generic EXE | 1. Install in the current directory. |
| OLE_DLL_FILE | 12 | an OLE inproc server | 1. Install in the current directory. |
| | | | 2. call DllRegisterServer |
| OLE_EXE_FILE | 13 | an OLE container or server EXE | 1. Install in the current directory. |
| | | | 2. run with -Register on command line. |
| REG_FILE | 14 | a .REG file | 1. use the Registry APIs to add all entries in the file to the Windows Registry |
| LC_OCX_FILE | 15 | a Lotus components OCX | 1. Verify the signature |
| | | | 2. Install in the current directory. |
| | | | 3. call LoadLibrary on it |
| | | | 4. call DllRegisterServer |
| LC_DLL_FILE | 16 | a Lotus components DLL | 1. Verify the signature |
| | | | 2. Install in the current directory |
| | | | 3. check to see if it is self-registering (if not, skip all remaining steps) |
| | | | 4. call LoadLibrary on it |
| | | | 5. call DllRegisterServer |
| LC_EXE_FILE | 17 | A Lotus components EXE | 1. Verify the signature |
| | | | 2. Install the current directory |
| | | | 3. Create a process with the file using -Register on the command line |
| GENERIC_FILE | 18 | a generic file | 1. Install in the current directory |
| ARJ_FILE | 19 | a file created using ARJ compression | 1. decompress into the current directory |
| ZIP_FILE | 20 | a file created using compression | 1. decompress into the current directory |
| LHZ_FILE | 21 | a file created using LHZ compression | 1. decompress into the current directory |
| INSTRUCTIONS_BLOCK | 22 | A Lotus Components Distribution Pack Instructions Block:<br>1. DWORD dwNumChars-number of OLECHARs to follow | 1. display a dialog with the instructions for this distribution pack |

| Attachment Type | ID | Description | Installation Instructions |
|---|---|---|---|
| | | 2. OLECHAR[dwNumChars]- UniCode instructions string | |
| TYPELIB_TLB | 23 | An OLE TypeLibrary | 1. Install in the current directory |
| | | | 2. register the .TLB |
| TYPELIB_ODL | 24 | An OLE TypeLibrary (.ODL) | 1. Install as a temp file |
| | | | 2. Run mktyplib on the temp file to create a .TLB file in the current directory |
| | | | 3. Register the resulting .TLB |

What is claimed is:

1. In an object-oriented computer system having an operating system configured to execute one or more base components, each component implemented as an object having a class definition and defined methods, a method of creating templates of customizations to a base component comprising the steps:

a. selecting a base component;
 b. modifying the state of persistent data of the base component;
 c. saving the modifications to the state of the persistent data of the base component; and
 d. formatting the modifications to the state of the persistent data of the base component into a template.

2. The method of claim 1 further comprising the step of:
 e. generating a template distribution pack containing at least one template.

3. The method of claim 2 wherein step e further comprising the step of:
 e.1 appending a self executing installer program to the template within the distribution pack.

4. The method of claim 3 further comprising the step of:
 f. loading at least one base component;
 g. receiving a template distribution pack containing at least one template;
 h. selectively forwarding method calls to the base component in response to the modifications to the persistent data of the base component contained within the template.

5. The method of claim 4 further comprising the step of:
 i. selectively modifying the results of method calls from the base component in response to modifications to persistent data of the base component as stored in the template.

6. The method of claim 1 further comprising the step of:
 f. receiving users-defined instructions related to the use of the modified base component.

7. A computer program product for use with an object-oriented computer system having an operating system configured to execute one or more base components, each base component implemented as an object having a class definition and defined methods, the computer program product comprising a computer usable medium having computer readable program code embodied in the medium for enabling the loading and utilization of one or more base components, the medium further comprising:

program code responsive to a base component for loading a base component onto the computer system;
 program code defining a base component; and,
 program code, responsive to selection of one of the base components, for enabling modification of the persistent data of the base component and for storage of the modifications to the base component as a template within a template storage file.

8. The computer program product of claim 7 further comprising:
 program code, responsive to a base component and template data, for selectively forwarding method calls to the base component and for selectively modifying results of the method calls to modify the behavior of the base component as defined by the template data.

9. The computer program product of claim 7 further comprising:
 program code, responsive to template data, for generating a template distribution pack comprising template data and a self-executing installation program.

10. A computer data signal embodied in a carrier wave comprising:
 program code responsive to a base component for loading a base component onto a computer system;
 program code defining a base component; and,
 program code, responsive to selection of a base component, for enabling modification of persistent data of the selected base component and for storing modifications to the selected base component as a template within a template storage file.

11. The computer data signal of claim 10 further comprising:
 program code, responsive to a base component and template data, for selectively forwarding method calls to the base component and for selectively modifying results of the method calls to modify the behavior of the base component as defined by the template data.

12. The computer data signal of claim 10 further comprising:
 program code, responsive to template data, for generating a temperate distribution pack comprising template data and a self-executing installation program.

13. In an object-oriented computer system having a processor, a memory coupled to the processor, and an operating system configured to execute one or more base components, each component implemented as an object having a class definition and defined methods, apparatus for creating templates of customizations to a base component comprising:

a. component loader logic stored in memory and configured to load a base component onto the computer system;
 b. template builder logic stored in memory and configured to enable:

(i) selection of a base component; and
(ii) modification of persistent data of a base component;

c. template storage logic stored in memory and responsive to the template builder logic, and configured to format the modifications to the persistent data of a base component into a template format suitable for storage; and d. a template storage file stored in memory and responsive to the template storage logic, for storing one or more templates therein.

14. The apparatus of claim 13 wherein the template builder logic further comprises:

distribution pack generator logic, responsive to the template builder logic and the template storage file, configured for generating a template distribution pack containing at least one template.

15. The apparatus of claim 14 wherein the template builder logic further comprises a template installer executable program and replication logic for copying the template installer executable program into a template distribution pack.

16. The apparatus of claim 15 wherein the template distribution pack comprises:

i. the template installer executable program;
ii. at least one template; and
iii. a data dictionary.

17. The apparatus of claim 14 wherein the template storage logic further comprises logic configured to retrieve from a file system registry information associated with a template and to store said information in the form of a key within a template.

18. The apparatus of claim 13 wherein the template builder logic further comprises logic configured to enable entry of user-defined instructions related to use of a modified base component.

19. The apparatus of claim 13 in combination with an operating system, the operating system having a file system registry capable of storing information associated with a base component or template, such information accessible by a key.

20. In an object-oriented computer system having an operating system configured to execute one or more base components, each component implemented as an object having a class definition and defined methods, a method of distributing customizations to a base component comprising the step of:

a. selecting a base component:
b. modifying the base component;
c. storing the changes to the base component in a template;
d. generating from the template a distribution pack containing at least the template and a self-executing installation program;
e. distributing the template distribution pack to a recipient system having loaded thereon the base component; and
f. selectively modifying the behavior of the base component in response to information contained in the template derived from the base component.

21. The method of claim 20 wherein step f further comprises:

f.1 selectively forwarding method calls to the base component in response to data contained within the template.

22. The method of claim 20 wherein step f further comprises:

f.1 selectively modifying results of method calls from the base component in response to data within the template.

* * * * *